(12) United States Patent
Kawabata

(10) Patent No.: US 6,879,362 B2
(45) Date of Patent: Apr. 12, 2005

(54) CHOLESTERIC LIQUID CRYSTAL COLOR FILTER AND PROCESS FOR PRODUCING THE SAME

(75) Inventor: Kouya Kawabata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 282 days.

(21) Appl. No.: 10/224,580

(22) Filed: Aug. 21, 2002

(65) Prior Publication Data

US 2003/0137632 A1 Jul. 24, 2003

(30) Foreign Application Priority Data

Aug. 22, 2001 (JP) ........................................ 2001-251417
Aug. 22, 2001 (JP) ........................................ 2001-251456

(51) Int. Cl.$^7$ ............................................. G02F 1/1335
(52) U.S. Cl. ........................ 349/115; 349/110; 349/175; 430/20
(58) Field of Search ................................ 349/106, 110, 349/115, 156, 175

(56) References Cited

U.S. PATENT DOCUMENTS

| | | | |
|---|---|---|---|
| 4,061,417 A | | 12/1977 | Katagiri |
| 5,096,520 A | | 3/1992 | Faris |
| 5,668,614 A | | 9/1997 | Chien et al. |
| 5,771,084 A | * | 6/1998 | Fujimori et al. ............. 349/153 |
| 6,549,261 B1 | * | 4/2003 | Okada et al. ................ 349/176 |
| 6,573,961 B2 | * | 6/2003 | Jiang et al. .................. 349/115 |

FOREIGN PATENT DOCUMENTS

| JP | 51-56658 A | 5/1976 |
|---|---|---|
| JP | 59-83112 A | 5/1984 |
| JP | 59-83113 A | 5/1984 |
| JP | 8-234196 A | 9/1996 |
| JP | 8-304626 A | 11/1996 |
| JP | 9-61814 A | 3/1997 |
| JP | 9-304613 A | 11/1997 |
| JP | 10-260387 A | 9/1998 |
| JP | 10-282324 A | 10/1998 |
| JP | 10-316755 A | 12/1998 |
| WO | WO 98/20090 A1 | 5/1998 |
| WO | WO 00/34808 A1 | 6/2000 |

OTHER PUBLICATIONS

R.A.M. Hikmet et al. "Electrically Switchable Mirrors and Optical Components Made from Liquid–Crystal Gels" Nature, vol. 392 Apr. 2, 1998 p. 476–479.

Sandi Campbell et al. "Photochemical Modification of a Side Chain Copolysiloxane with a Cholesteric Phase" Chem. Matter., vol. 10, No. .6 1998.

* cited by examiner

Primary Examiner—Karl D. Frech
Assistant Examiner—Daniel Walsh
(74) Attorney, Agent, or Firm—Sughrue Mion, PLLC

(57) ABSTRACT

The present invention provides a cholesteric liquid crystal color filter including partition walls that are formed at pixel boundaries, produced by: forming a liquid crystal layer comprising a cholesteric liquid crystal composition including at least a liquid crystal compound, a photoreactive chiral agent and a polymerization initiator; and irradiating the liquid crystal layer with UV light having wavelengths to which the polymerization initiator is photosensitive through a photomask to form the partition walls at areas corresponding to the pixel boundaries while the liquid crystal layer is in an isotropic liquid state or in a cholesteric state not exhibiting selective reflection of light in the visible range. The invention also provides a process for producing a cholesteric liquid crystal color filter including openings that are formed at positions corresponding to at least contact holes and/or electrode lead-out portions.

10 Claims, 4 Drawing Sheets

⇩ UV IRRADIATION(SHORT WAVELENGTH)

UV IRRADIATION(LONG WAVELENGTH)

⇩ UV IRRADIATION(SHORT WAVELENGTH)

⇓ UV IRRADIATION (SHORT WAVELENGTH)

CHOLESTERIC LIQUID CRYSTAL COLOR FILTER AND PROCESS FOR PRODUCING THE SAME

BACKGROUND OF THE INVENTION

1. Field of the Invention

The present invention relates to a cholesteric liquid crystal color filter suitably used in displays such as LCDs and a process for producing the same. More specifically, the invention relates to a cholesteric liquid crystal color filter that has excellent color resolution in respective pixels, color reproducibility and display contrast as well as to a process for producing the same.

2. Description of the Related Art

Color filters used in, for example, color liquid crystal displays are generally composed of red (R), green (G) and blue (B) pixels, and a black matrix arranged therebetween for improving display contrast. Such color filters have generally been produced by spin-coating a glass plate with colored resin solutions in which respective pigments are dispersed in the resin for each color followed by patterning by photolithography, or by printing colored-pxels directly on a substrate.

Contact holes for connecting TFT elements to display pixels and openings for electrode lead-out portions are formed, separately after the colored pixels (and black matrix) have been formed, by forming a resist and subsequently dry-etching of the resist.

However, the printing method has a problem in that it is difficult to form highly accurate image patterns due to low resolution of the pixels, while the spin-coating method has a problem in that loss of materials is large and uneven coating occurs when a large area is coated. Further, since openings such as contact holes must be formed by forming a resist and subsequently dry-etching of the resist after colored pixels have been formed, the above methods are disadvantageous in that production costs are high. It is thus difficult to manufacture color filters at a low cost under the current circumstances.

Color filters made mainly of a liquid crystal material (particularly, a cholesteric liquid crystal) have widely been studied to enable efficient and easy manufacture of high-quality color filters having excellent transmittance and color purity with reduced loss of materials.

Since a color filter made mainly of a cholesteric liquid crystal (also referred to as a "cholesteric liquid crystal color filter" below) uses polarized light to effect image display by reflecting light of a predetermined wavelength and transmitting light of other wavelengths, the color filter can efficiently utilize light and has excellent transmittance and color purity. From the viewpoint of decreasing the number of steps and lowering costs in the production process with reduced loss of materials, a production process using a photoreactive chiral compound (chiral agent) is particularly useful. If a liquid crystal composition containing a photoreactive chiral agent is used, isomerization of the chiral agent progresses when the compound is patternwise irradiated with light of wavelengths to which the chiral agent is photosensitive, depending on the intensity of the irradiation energy (amount of light irradiated). This causes a change in helical pitch (twist angle of the helix) of the liquid crystal compound, whereby desired selectively reflected color light can simply be obtained by conducting patterning exposure having varied light quantities one time.

However, conventional cholesteric liquid crystal color filters have problems such as poor resolution, which is attributable to diffusion of a photoreactive chiral agent among pixels. Another problem is that, because the colored pixels and the black matrix (also referred to as "color filter layer" below) are formed on the entire substrate surface, it is not easy to form contact holes and electrode lead-out portions per pixel. As an example of techniques relevant thereto, the assignee has previously proposed a method of forming contact holes (Japanese Patent Application No. 2001-070568), but this method cannot be conducted at a low cost.

To cope with the aforementioned problems, a method has been proposed in which, besides a liquid crystal compound, a polymerizable monomer is added to a liquid crystal composition and cured to form partition walls so that diffusion of the chiral agent can be prevented to thereby enhance resolution. However, adding a polymerizable monomer may sometimes significantly change the aligning property and phase transition temperature of the liquid crystal compound. Hence, it has been difficult to form color filters having sufficient reflective strength. To solve this problem, the assignee has previously proposed a method of forming partition walls by polymerizing a liquid crystal compound (Japanese Patent Application No. 2001-10534), but the formed partition walls may occasionally develop colors themselves by selectively reflecting visible light. If this proposed color filter is used as a reflective liquid crystal display element, contrast of the display element may be lowered. There has thus been a demand for additional improvement.

In a case where a film (layer) (e.g., a color filter layer) containing a cholesteric liquid crystal composition is formed by applying coating, an undesirable state occurs in that, even if treatment is conducted to align the liquid crystal molecules parallel to a substrate at a substrate side of the layer, the inclination angle (pre-tilt angle) of the liquid crystal molecules continuously changes in the thickness direction of the layer, particularly when using a low-molecular weight liquid crystal. Such a state is caused by the fact that one face of the color filter forming layer is exposed to the environment, whereby the liquid crystal molecules are oriented perpendicular to the substrate at the side exposed to air. Therefore, this layer usually needs be disposed between alignment layers. In a case where the cholesteric liquid crystal composition is polymerized for use as an optical film, it is necessary to peel off at least one of the above-described alignment layers after polymerization in order to achieve a light weight and thinness. Thus, there have been problems in that more steps are required, such as producing and removing the alignment layers, and larger amounts of waste are produced. As described above, there has not yet been provided a process for readily producing a color filter with improved transmittance and color purity, by which reduced loss of materials can be achieved, contact holes and openings can be formed at a low cost, and in which aligning can be carried out easily and efficiently.

SUMMARY OF THE INVENTION

Accordingly, an object of the present invention is to provide a cholesteric liquid crystal color filter in which color pixel resolution is improved by securely preventing diffusion of a chiral agent isomerized by UV irradiation and that exhibits excellent contrast when used as a liquid crystal display clement.

Another object of the invention is to provide a process for producing a cholesteric liquid crystal color filter that exhibits a broad range of selectively reflected colors and excellent color purity, by which aligning can easily and effectively be conducted, contact holes and openings for electrode lead-out portions per pixel can readily be formed at a low cost, and in which reduced loss of materials is achieved.

These objects are attained by the invention described hereinafter.

A first aspect of the invention is a cholesteric liquid crystal color filter including partition walls that are formed at pixel boundaries, produced by: forming a liquid crystal layer comprising a cholesteric liquid crystal composition including at least a liquid crystal compound, a photoreactive chiral agent and a polymerization initiator; and irradiating the liquid crystal layer with UV light having wavelengths to which the polymerization initiator is photosensitive through a photomask to form the partition walls at areas corresponding to the pixel boundaries while the liquid crystal layer is in an isotropic liquid state or in a cholesteric state not exhibiting selective reflection of light in the visible range.

A second aspect of the invention is a process for producing a cholesteric liquid crystal color filter including openings that are formed at positions of at least contact holes and/or electrode lead-out portions, comprising the steps of: forming a liquid crystal layer comprising a cholesteric liquid crystal composition including at least a liquid crystal compound, a chiral agent and a polymerization initiator; forming pixels by patterning; and thereafter irradiating the liquid crystal layer with light having wavelengths to which the polymerization initiator is photosensitive through a photomask having light-shading areas corresponding to said at least contact holes and/or electrode lead-out portions to cause photo-polymerization at the irradiated portions followed by development to form the openings at said positions.

Hereinafter, formation of the partition walls and formation of the openings, which are characterizing features of the cholesteric liquid crystal color filter of the invention, are described in more detail.

1. Formation of Partition Walls

The cholesteric liquid crystal color filter of the invention is characterized in that it includes partition walls that are formed at pixel boundaries, produced by: forming a liquid crystal layer comprising a cholesteric liquid crystal composition including at least a liquid crystal compound, a photoreactive chiral agent and a polymerization initiator; and irradiating,the liquid crystal layer with UV light having wavelengths to which the polymerization initiator is photosensitive through a photomask to form the partition walls at areas corresponding to the pixel boundaries while the liquid crystal layer is in an isotropic liquid state or in a cholesteric state not exhibiting selective reflection of light in the visible range.

That is, according to the first aspect of the invention, there is provided a cholesteric liquid crystal color filter including partition walls to prevent diffusion of the photoreactive chiral agent and hence does not substantially display selective reflection of visible light, by irradiating the liquid crystal layer with UV light while the liquid crystal layer is in an isotropic liquid state or in a cholesteric state not exhibiting selective reflection of light in the visible range.

As used herein, the phrase "not substantially display selective reflection of visible light" means both not displaying selective reflection of all rays including visible light and displaying selective reflection of non-visible light, but not displaying selective reflection of visible light.

The phrases "the liquid crystal layer in an isotropic liquid state" and "the liquid crystal layer in a cholesteric state not exhibiting selective reflection of light in the visible range" will now be described.

(i) Liquid Crystal Layer in an Isotropic Liquid State

The "liquid crystal layer in an isotropic liquid state" refers to a state in which a liquid crystal compound present in the liquid crystal layer exhibits isotropy but is not in a liquid crystal state, that is, the liquid crystal layer does not display selective reflection of all rays including visible light. In this case, the partition walls formed by UV irradiation do not reflect all transmitted rays, and hence the partition walls are in an uncolored state.

(ii) Liquid Crystal Layer in a Cholesteric State not Exhibiting Selective Reflection of Light in the Visible Range The "liquid crystal layer in a cholesteric state not exhibiting selective reflection of light in the visible range" refers to a state in which a liquid crystal compound present in the liquid crystal layer is a cholesteric liquid crystal state, whereby selective reflection occurs, but only in the UV or IR region. In this case, the partition walls formed by UV irradiation do not display selective reflection of visible light. Accordingly, the formed partition walls are in an uncolored state, similar to the case where the liquid crystal layer is in an isotropic liquid state.

The range in which a liquid crystal compound in a cholesteric state displays selective reflection depends on the length of the helical pitch of the liquid crystal compound. That is, if the helical pitch is long, selective reflection occurs in the IR region, while if the pitch is short, selective reflection occurs in the UV region. Accordingly, by controlling the length of the helical pitch, the liquid crystal compound can selectively reflect light in the UV or IV region, that is, a cholesteric state not exhibiting selective reflection of light in the visible range. If polymerization for curing is effected in this state, partition walls that do not display selective reflection of visible light can be formed.

2. Formation of Openings

According to the second aspect of the invention, there is provided a process for producing a cholesteric liquid crystal color filter, characterized in that a liquid crystal layer (color filter layer) having formed pixels therein is fixed by irradiation with light having a predetermined wavelength through a photomask having light-shading areas corresponding to at least contact holes and/or electrode lead-out portions.

The process for producing the cholesteric liquid crystal color filter according to the invention comprises: forming a liquid crystal layer containing a cholesteric liquid crystal composition; forming pixels by patterning (pixel formation) (hereinafter, this step is sometimes referred to as "pixel-forming step"); and irradiating light having a wavelength (wavelength: $\lambda^b$) to which a polymerization initiator is photosensitive through a photomask having light-shading areas corresponding to at least contact holes and/or electrode lead-out portions to cause polymerization of the irradiated positions (hereinafter, this step is sometimes referred as "fixing step") followed by development thereof, to form openings at the positions (hereinafter, this step is sometimes referred to as "developing step").

<Pixel-forming Step>

In the pixel-forming step, a liquid crystal layer containing a cholesteric liquid crystal composition is formed on a desired substrate and patterning is conducted to form pixels (colored pixels) thereon.

As the patterning method, conventionally known methods can suitably be used depending on the characteristics and composition of a chiral agent described later. In a preferable embodiment of the invention, the cholesteric liquid crystal composition containing a photoreactive chiral agent as the chiral agent (hereinafter, this composition is sometimes referred to as "photoreactive cholesteric liquid crystal composition") is subjected to patterning by irradiating light of a predetermined wavelength (wavelength: $\lambda^a$) to which the photoreactive chiral agent is photosensitive.

For example, when a photoreactive cholesteric liquid crystal composition used as the liquid crystal composition is irradiated with light of wavelength $\lambda^a$, the photoreactive chiral agent reacts to cause trans-cis-isomerization depending on illumination intensity, to thereby induce a change in the helical structure (helical pitch) of the liquid crystal compound, whereby desired selective reflection of light, namely, a desired hue (selectively reflected color) is exhibited. If illumination intensity is altered for each of the specified regions, the desired hue is exhibited. A selectively reflected image can be obtained by irradiating the liquid crystal composition in this state with light of wavelength $\lambda^b$ ($\neq \lambda^a$; $\lambda^b$ is a wavelength to which the polymerization initiator is photosensitive) to cause polymerization and hardening.

Irradiation of the cholesteric liquid crystal composition (hereinafter also referred to as "cholesteric liquid crystal phase") with light of wavelength of $\lambda^a$ may be conducted at arbitrary regions thereof. That is, irradiation may be conducted on an entire surface of the cholesteric liquid crystal phase or at only the portions including desired regions to be colored. The cholesteric liquid crystal phase may be imagewise irradiated, but from the viewpoint of simplifying the procedures without limiting the production steps, the regions to be irradiated are not specifically limited. By using a photomask having areas different in transmitting light quantities for each pixel region, plural kinds of colored pixels can be formed by once irradiating the composition with light of wavelength $\lambda^a$.

The wavelength of $\lambda^a$ is preferably specified within a photosensitive wavelength range of the photoreactive chiral agent, particularly at a wavelength close to the peak photosensitive wavelength thereof in order to achieve sufficient patterning sensitivity.

The irradiated quantity or illuminance (illumination intensity) of light of wavelength $\lambda^a$ is not particularly limited and can suitably be selected depending on the material used in order to achieve sufficient photosensitivity. The light source is preferably a high-energy light source emitting UV rays, such as a high-pressure mercury lamp, a metal halide lamp and an Hg—Xe lamp, by which the structural change and polymerization reaction of the liquid crystal compound can rapidly be achieved. The light source preferably has a function of varying light quantities.

The photomask used in irradiating with light of $\lambda^a$ can be suitably selected from the photomasks known in the art, such as those having patterned openings or patterned transmittance.

After irradiating light of wavelength $\lambda^a$, additional irradiation with light of wavelength $\lambda^b$ is conducted in the fixing step to fix alignment of the liquid crystal molecules to securely maintain the selective reflective wavelength as described later.

Accordingly, any of the steps of adjusting hues (coloring caused by selective reflection) by making the cholesteric liquid crystal phase to show a state exhibiting desired selective reflection, patterning, and fixing the selective reflective wavelength by polymerizing and curing the cholesteric liquid crystal phase can be conducted by irradiating the cholesteric liquid crystal composition with light.

By carrying out the aforementioned steps, a high-quality color filter excellent in color purity can be produced efficiently and easily with reduced loss of the material.

<Fixing Step>

In the fixing step, the liquid crystal layer is irradiated with light of a predetermined wavelength (wavelength: $\lambda^b$) to which the polymerization initiator is photosensitive through a photomask (light-shading mask) having light-shading areas corresponding to at least contact holes and/or electrode lead-out portions, such that the irradiated positions are polymerized and hardened (fixed).

It is sufficient if exposure to light of wavelength $\lambda^b$ is conducted to avoid exposure at the areas corresponding to contact holes and electrode lead-out portions in each pixel. That is, imagewise exposure to light of $\lambda^b$ is not always necessary in pixel regions. For example, by irradiating an entire surface through a photomask (light-shading mask), in which light-shading areas have previously be provided not to irradiate contact holes and electrode lead-out portions, the liquid crystal composition is polymerized and hardened at portions excluding the light-shading areas, to thus form a final pattern.

The light-shading mask may be selected from commercially available masks or originally-made masks having a desired shape, etc.

The wavelength $\lambda^b$ is preferably specified within a photosensitive wavelength range of the polymerization initiator, particularly at a wavelength close to the peak sensitive wavelength thereof in order to achieve sufficient photopolymerizing sensitivity. Further, irradiated quantity or illuminance (illumination intensity) of light of wavelength $\lambda^b$ is not particularly limited and can suitably be selected depending on the material used in order to achieve sufficient photosensitivity. The light sources used for irradiating light of wavelength $\lambda^b$ may be the same light sources used for irradiating light of wavelength $\lambda^a$. The light source preferably has a function of varying light quantities.

<Developing Step>

Through the developing step, openings are finally formed at positions corresponding to contact holes and/or electrode lead-out portions.

In the fixing step described above, the positions corresponding to contact holes and/or electrode lead-out portions are not irradiated and hence retain a state which is soluble in a solvent. Therefore, the openings can easily be formed by dissolving the positions with the solvent. Examples of the solvent include methyl ethyl ketone, acetone, cyclohexanone, chloroform, n-methyl pyrrolidone and a mixture thereof.

Since the contact holes and electrode lead-out portions can be formed through the step of forming pixels, it is not required to separately conduct resist-forming and dry-etching thereof in order to form contact holes and electrode lead-out portions in pixels after the pixels (and a black matrix) have been formed.

<Cholesteric Liquid Crystal Composition>

The cholesteric liquid crystal composition for use in the invention is described in detail.

The cholesteric liquid crystal composition (hereinafter sometimes referred to simply as "liquid crystal composition") contains at least one liquid crystal compound, at least one chiral agent and at least one polymerization initiator. The composition may further contain a binder resin, a solvent, a surfactant, a polymerization inhibitor, a thickening agent, a coloring matter such as a pigment, a UV absorbent and a gelling agent, as necessary.

The liquid crystal compound is preferably a nematic liquid crystal compound, which may suitably be selected from conventional liquid crystal compounds. Particularly preferable is a nematic liquid crystal compound having at least one polymerizable group. And more preferably, the compound has the shape of rods.

In a preferable mode, the cholesteric liquid crystal composition contains a photoreactive chiral agent (photoreactive cholesteric liquid crystal composition) and an air interface alignment agent as a surfactant. In another preferable mode, the composition contains a polymerizable monomer.
(Nematic Liquid Crystal Composition)

The nematic liquid crystal compound for use in the invention can suitably be selected from liquid crystal compounds having anisotropy of a refractive index Δn of 0.10 to 0.40, polymeric liquid crystal compounds and polymerizable liquid crystal compounds having a polymerizable group or crosslinking group introduced to the ends of the liquid crystal molecule thereof. By using the (photoreactive) chiral agent in combination with the nematic liquid crystal compound, a cholesteric liquid crystal composition (cholesteric liquid crystal phase) is provided.

The nematic liquid crystal compound can be aligned by using e.g. an aligned substrate which underwent aligning treatment such as rubbing. Further, if the nematic liquid crystal compound is fixed in a solid phase, techniques such as cooling and polymerization may be used. That is, if the liquid crystal compound is efficiently polymerized in an aligned state, a tough film can be produced due to its high reactivity.

Suitable nematic liquid crystal compounds are, for example, a liquid crystal compound carrying an UV-curable functional group (e.g., an acrylate group etc.) introduced into the same molecule in order to be polymerized and cured upon UV irradiation. When this compound is fixed by irradiation with UV light, a high-strength color filter can be prepared at a low temperature of 120° C. or less.

In the invention, examples of the nematic liquid crystal compound include, but are not limited to, the following compounds.

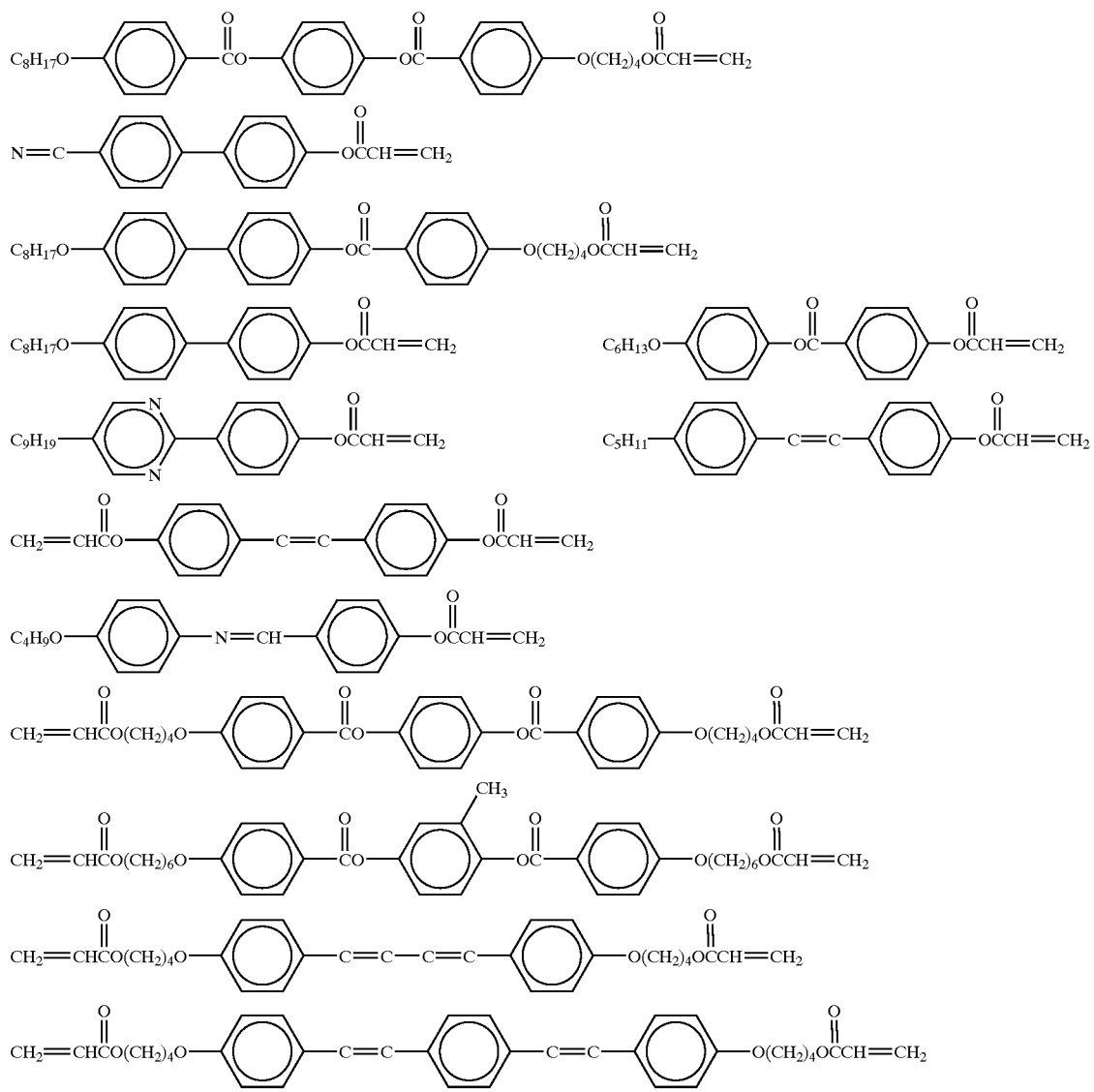

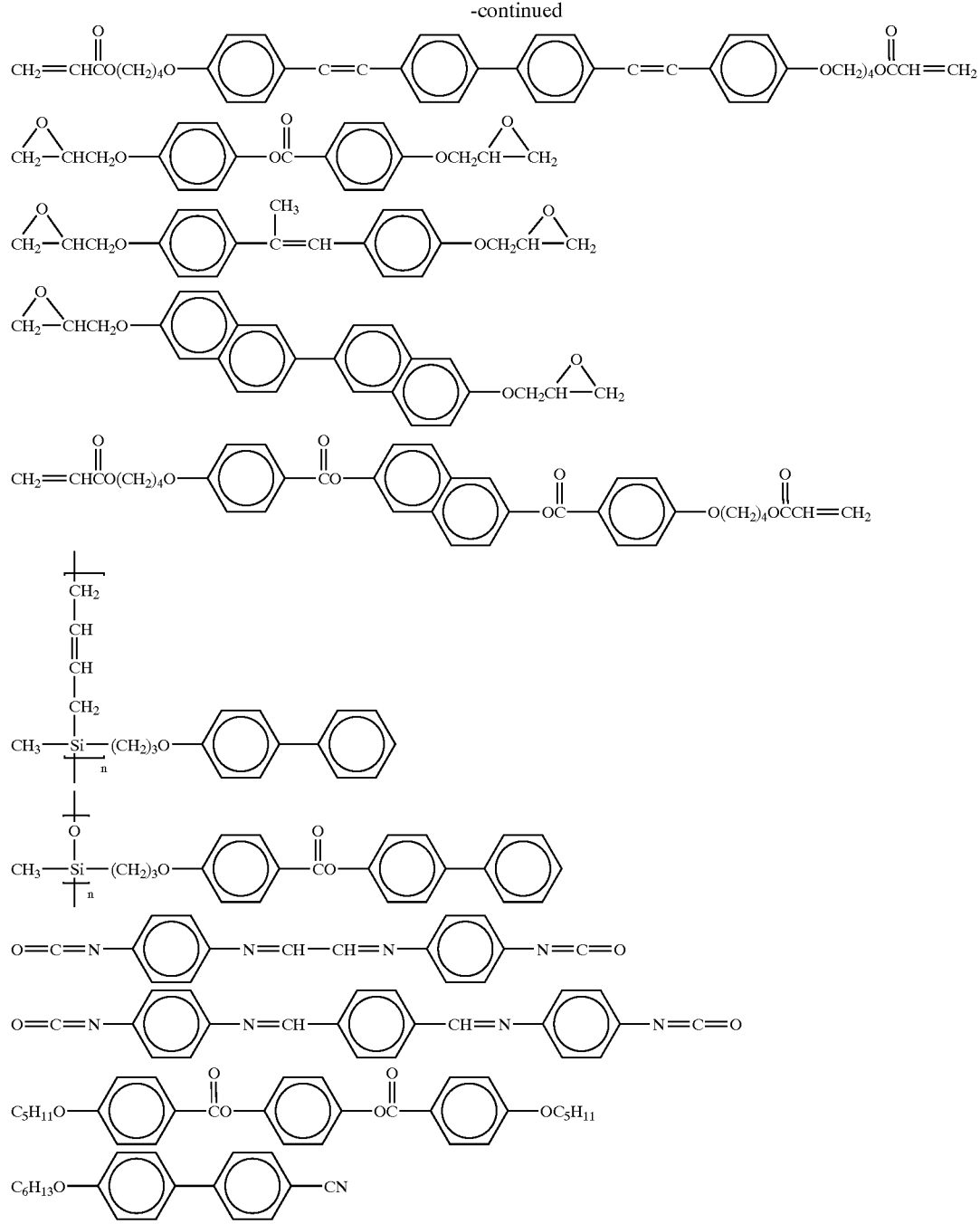

In the formulae shown above, n represents an integer of 1 to 1,000.

Also usable as preferable examples are compounds similar to the compounds exemplified above, in which side chain linking groups are replaced by groups having the following structures.

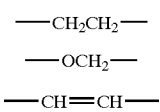

-continued

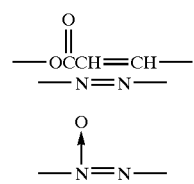

Among the nematic liquid crystal compounds listed above, polymerizable liquid crystal compounds having a polymerizable group or a crosslinking group in the molecule thereof are preferably used in the invention from the viewpoints of securing excellent curability and heat resistance of the layer.

When forming partition walls in the color filter according to the invention while the liquid crystal layer is in an isotropic liquid state, the liquid crystal compound used in the liquid crystal layer can be suitably selected without particularly limitation, insofar as the liquid crystal compound can exhibit isotropy by heating, etc.

The liquid crystal compounds may be used singly or in combination thereof. Further, the liquid crystal compound having no polymerizable group may be used in combination with the liquid crystal compound having a polymerizable group.

The content of the liquid crystal compound is preferably 30 to 98% by mass, more preferably 50 to 95% by mass, relative to the total solid content (mass) of the liquid crystal composition. When the content is less than 30% by mass, alignment may be insufficient to fail to achieve selective reflection of desired colors.

(Chiral Agent)

The chiral agent is a compound which exhibits twisting property when irradiated with light (from ultraviolet, through visible to infrared) and causes a change in helical pitch induced in the cholesteric liquid crystal composition. The chiral agent is suitably selected, depending on the use purposes, from the known chiral agents, such as the chiral agent having strong twisting property, the chiral agent having high temperature dependency and exerts no photoreactivity, among which the photoreactive chiral agent that exhibits twisting property when irradiated with light (from ultraviolet, through visible to infrared) and causes a change in helical pitch induced in the cholesteric liquid crystal composition is preferable. This compound has, as essential portion (a molecular structure unit), a chiral moiety and a moiety to undergo a structural change by irradiation with light. Both moieties are preferably contained in one molecule.

In the invention, it is possible to use the photoreactive chiral compound together with a chiral compound which exhibits twisting property having high temperature dependency and exerts no photoreactivity.

The chiral compound preferably has a peak photosensitive wavelength which is longer than that of the polymerization initiator in order to improve patterning sensitivity.

The chiral compound is preferably a compound which has an enhanced ability to induce the helical structure of the cholesteric liquid crystal composition. For this purpose, it is preferable to position the chiral moiety at the center of the molecule and render the periphery portions to have a rigid structure. The molecular weight of the chiral compound is preferably 300 or more. In order to increase the ability to induce the helical structure by irradiation with light, it is preferable to use a compound whose structural change caused by the irradiation is large and whose chiral moiety is arranged closer to the moiety to undergo a structural change by the irradiation.

The chiral compound which is highly soluble in a nematic liquid crystal compound is preferable, and particularly preferable is the compound having a solubility parameter (SP) value closer to that of the polymerizable liquid crystal monomer. When the chiral compound has a structure into which one or more polymerizable bonding groups have been introduced, a liquid crystal composition film produced (color filter) and an optical film produced (selectively reflective film) can have enhanced heat resistance.

Examples of the structure of photoreactive moieties which undergo a structural change by irradiation with light include those described in "Photochromic Compounds" (written by Kingo Uchida and Masahiro Irie, Chemical Industry, Vol. 64, p.640, 1999, and written by Kingo Uchida and Masahiro Irie, Fine Chemical, vol. 28(9), p.15, 1999).

Specific examples are described hereinafter. In the present invention, however, the photoreactive chiral compounds are not limited thereto.

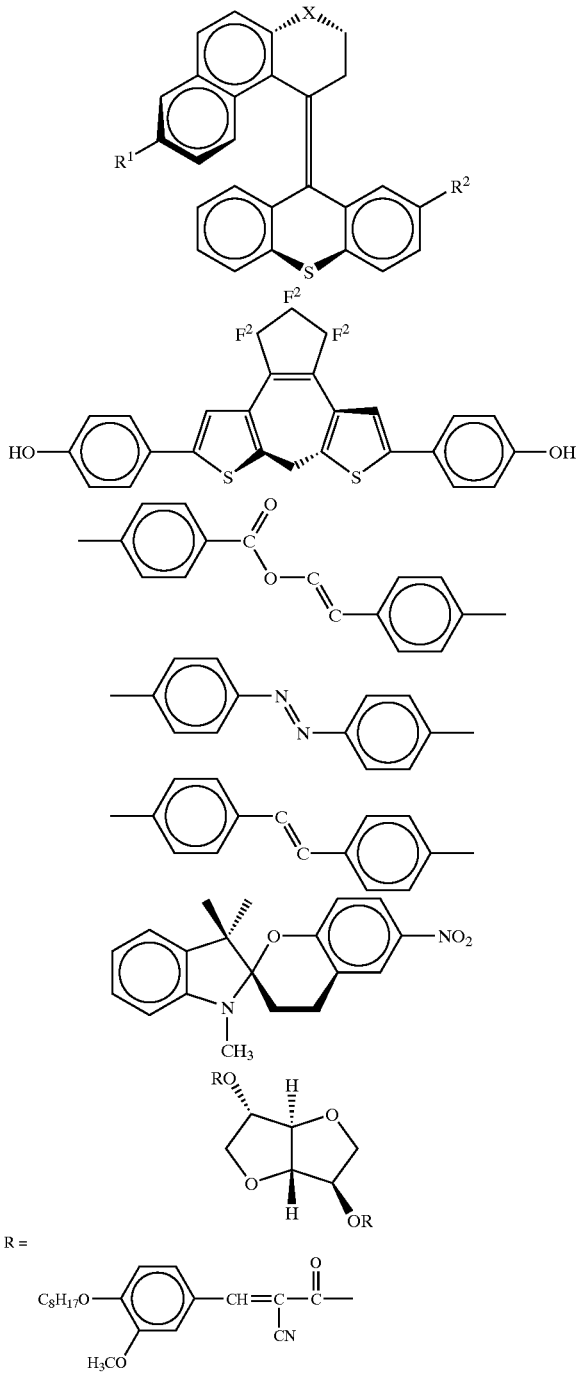

In the above formula, $R^1$ and $R^2$ each represent an alkyl group, an alkoxy group, an alkenyl group or an acryloyloxy group.

The chiral moiety may be a moiety at which decomposition, addition reaction, isomerization, dimerization or the like is effected by irradiation with light to thereby cause an irreversible structural change.

Furthermore, the chiral moiety corresponds to the position of an asymmetric carbon bonded to four different substituents, for example, as shown by the symbol * in the compounds illustrated below (Chemistry of Liquid Crystal, No. 22, Hiroyuki Nohira, Chemistry Review, p.73, 1994).

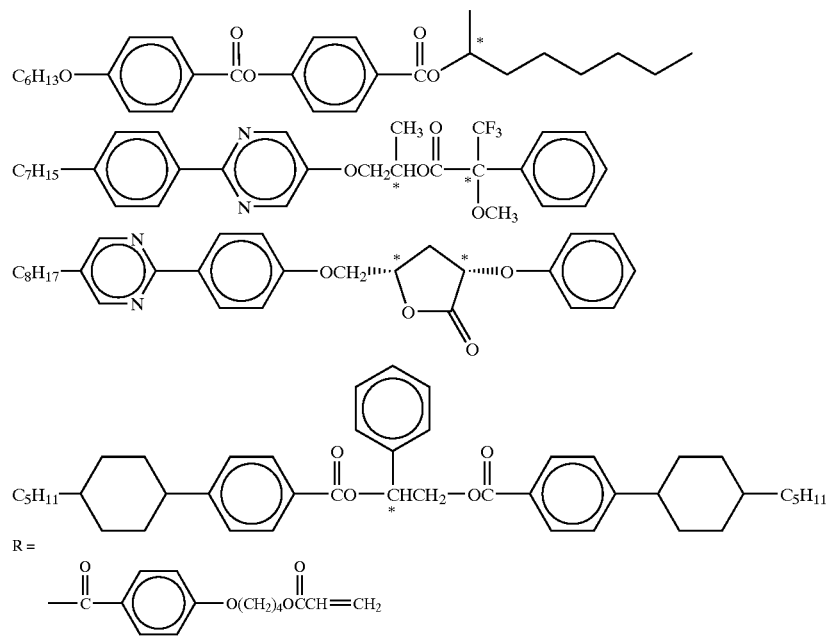

As an example of photoreactive chiral compounds having both a chiral moiety and a photo-isomerizable moiety, the following compound is exemplified.

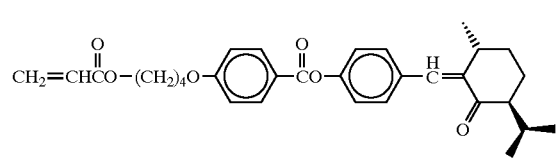

Also preferable is a photoreactive chiral compound represented by the following general formula (I) or (II).

In the general formulae (I) and (II) shown above, R represents a hydrogen atom, an alkoxy group having 1 to 15 carbon atoms, an acryloyloxyalkyloxy group having a total of 3 to 15 carbon atoms, or a methacryloyloxyalkyloxy group having a total of 4 to 15 carbon atoms.

For the compound represented by the general formula (I), examples of the R group are exemplified hereinafter (compounds (1) to (15)). In the present invention, however, the compounds represented by the general formula (I) are not limited thereto.

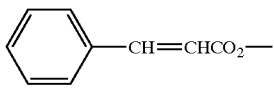
(1)

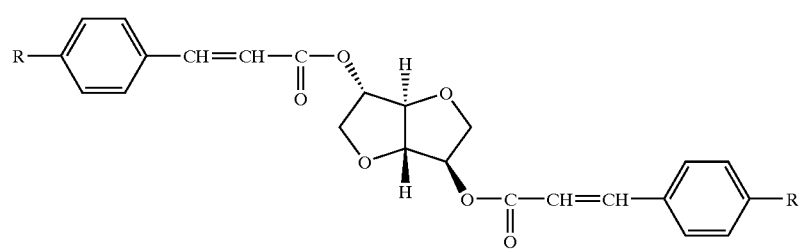

general formula (I)

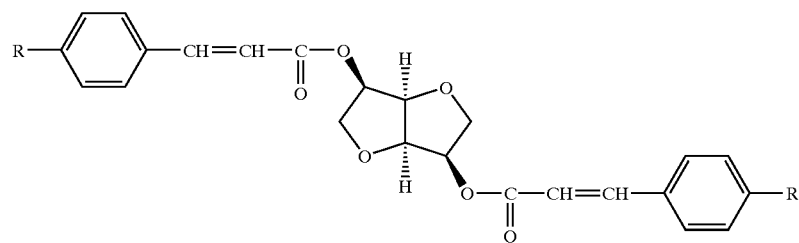

general formula (II)

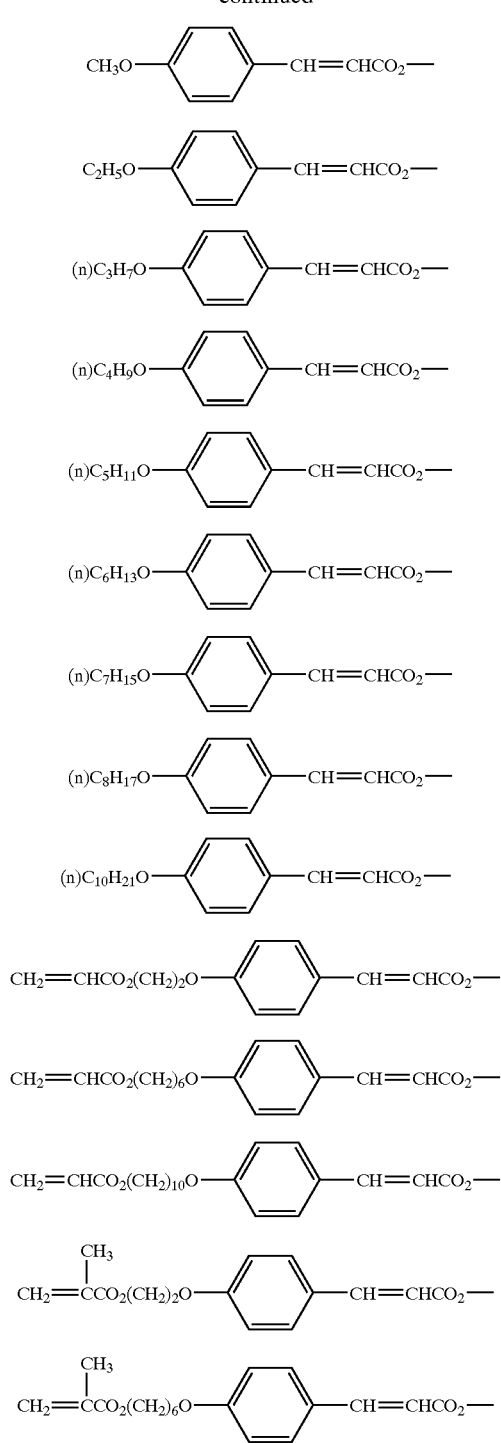

The (photoreactive) chiral agents to be added to the liquid crystal composition may suitably be selected, except for the following case, without imposing any limitation, insofar as the object of the invention can be attained. Preferably, the amount of the chiral agent to be added to the composition is from about 2 to 30% by mass.

In a case where the liquid crystal compound exhibits selective reflection only in the UV region, it is preferable in the invention to choose a photoreactive chiral agent having a high twisting force and/or to increase the addition amount of the chiral compound to shorten the helical pitch of the liquid crystal compound.

(Polymerization Initiator)

In order to fix the helical structure after the twisting property of the liquid crystal has been altered by light irradiation and to improve strength of the liquid crystal composition after fixing, polymerization initiators may be included to the liquid crystal composition for the purpose of promoting polymerization reaction through an unsaturated bond.

The polymerization initiator contributes to promote polymerization reaction through an unsaturated bond, to polymerize and harden the liquid crystal composition for fixing, and improve strength of the liquid crystal composition after fixing. The polymerization initiator can suitably be selected from known compounds exhibiting photoreactivity, thermal reactivity or the like, among which a polymerization initiator capable of promoting the reaction by irradiation with light is preferable. If the polymerization initiator is included in the composition, a polymerizing reaction for curing the cholesteric compound or the like can promptly be effected. Thus, selective reflection of color light having a large anisotropy of a refractive index (Δn) as well as high resolution and excellent color purity can stably be achieved.

The photopolymerization initiator can suitably be selected from conventionally known ones. Examples of the photopolymerization initiator include p-methoxyphenyl-2,4-bis(trichloromethyl)-s-triazine, 2-(p-butoxystyryl)-5-trichloromethyl-1,3,4-oxadiazole, 9-plienylacridine, 9,10-dimethylbenzphenazine, benzophenon/Michler's ketone, hexaarylbiimidazole/mercaptobenzimidazole, benzyl dimethyl ketal and thioxanthone/amine.

The addition amount of the polymerization initiator is preferably from 0.1 to 20%, more preferably from 0.5 to 5% by mass relative to the solid content (mass) of the liquid crystal composition. If the addition amount is less than 0.1% by mass, hardening efficiency is lowered so that a prolonged time may be required for polymerization. If the addition amount is more than 20% by mass, light transmittance in a range of from ultraviolet to visible may be decreased.

(Polymerizable Monomer)

A polymerizable monomer may also be included in the liquid crystal composition to an extent that the effects of the invention are not impaired. If the polymerizable monomer is used therein, after the patterning, the helical structure is fixed (selective reflectivity) and strength of the fixed liquid crystal layer can be enhanced. However, if the nematic liquid crystal compound has an unsaturated bond in the molecule, the polymerizable monomer needs not necessarily be included in the composition.

It is particularly preferable in the invention that only the liquid crystal compound undergoes polymerization and curing for producing the color filter, without including polymerizable monomers in the liquid crystal composition, from the standpoint of reducing the influence on alignment of the liquid crystal compound.

As the polymerizable monomer, a monomer having an ethylenically unsaturated bond may be exemplified. Specific examples thereof include polyfunctional monomers such as pentacrythritol tetraacrylate, dipentaerythritol hexaacrylate.

Specific examples of the monomer having an ethylenically unsaturated bond are shown below. However, these examples are not limiting the present invention.

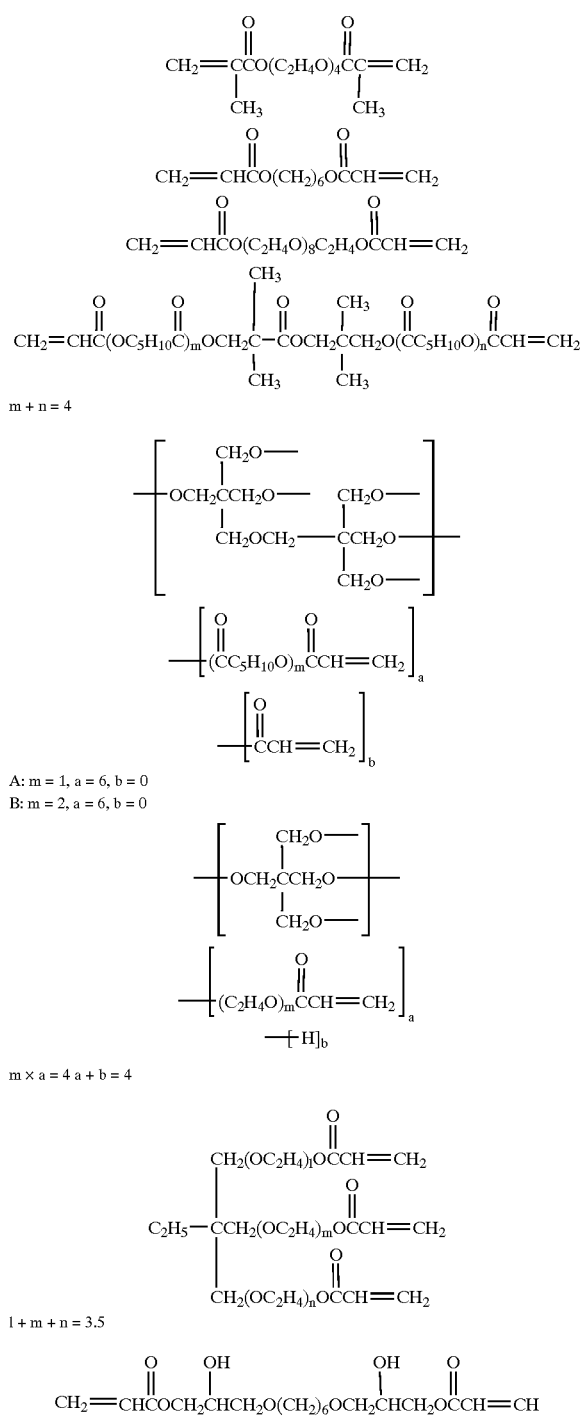

The addition amount of the polymerizable monomer is preferably from 0.5 to 50% by mass relative to a total solid content (mass) of the liquid crystal composition. If the amount is less than 0.5% by mass, sufficient curability may occasionally be impaired. If the amount is more than 50% by mass, alignment of the liquid crystal molecules is inhibited so that sufficient color-development may not be attained.

(Additional Components)

As additional components, the following may be included in the composition: a binder resin, a solvent, a surfactant, a polymerization inhibitor, a thickening agent, a dye, a pigment, an ultraviolet absorbent, a gelling agent and so on.

Since the additional components have influence on strength of the color filter film hardened by ultraviolet rays, it is preferable that the additional components have excellent compatibility with the cholesteric liquid crystal compound.

If these components can move within the hardened color filter film, separated components cause a decrease in strength of the film to change various properties of the color filter. It is therefore preferable to use, as the additional components to be included, components having a functional group similar to the polymerizable functional group having been introduced into the cholesteric liquid crystal compound. Namely, the additional components are fixed in the liquid crystal composition, without being separated in the film, by polymerization and hardening, whereby various properties of the film, such as strength, are not affected. The addition amount of the additional components other than a binder resin and a surfactant is preferably 10% or less by mass relative to the total sold content (mass) of the liquid crystal composition. If this amount is more than 10% by mass, strength of the optical film (selectively reflective film) may be lowered.

Examples of the binder resin include polystyrene compounds such as polystyrene and poly-α-methylstyrene; cellulose resins such as methylcellulose, ethylcellulose and acetylcellulose; acidic cellulose derivatives having, as its side chain, a carboxylic group; acetal derivatives such as polyvinyl formal and polyvinyl butyral; and methacrylic acid copolymer, acrylic acid copolymer, itaconic acid copolymer, crotonic acid copolymer, maleic acid copolymer and partially-esterified maleic acid copolymer described in Japanese Patent Application Laid-Open (JP-A) Nos. 59-44615, Japanese Patent Application Publication (JP-B) Nos. 54-34327, 58-12577 and 54-25957, JP-A Nos. 59-53836 and 59-71048.

As other examples of the binder resin, there may be exemplified a homopolymer of an acrylic acid alkyl ester and a homopolymer of methacrylic acid alkyl ester in which an alkyl group may preferably be a methyl, ethyl, n-propyl, n-butyl, iso-butyl, n-hexyl, cyclohexyl, 2-cthylhexyl or the like group.

Besides, the binder resin may be a polymer having a hydroxyl group to which is added an acid anhydride, benzyl (meth)acrylate/(methacrylic acid homopolymer)acrylic acid copolymer, a multiple copolymer of benzyl(meth)acrylate/(meth)acrylic acid/another monomer, or the like.

Among the above-stated compounds, the binder resin having a carboxylic group is preferable from the viewpoint of developability with an alkaline solution after patterning and mass-productivity. In the case where the liquid crystal layer is formed on a plastic substrate (by coating, transferring or the like), use of a binder resin containing a carboxylic group, as the binder component, in a cholesteric liquid crystal composition prepared as a coating liquid form allows development with an alkaline solution. Development with an alkaline solution after irradiation with light facilitates patterning.

The addition amount of the binder resin in the liquid crystal composition is preferably from 0 to 50% by mass, and more preferably from 0 to 30% by mass. If the amount is more than 50% by mass, alignment of the cholesteric liquid crystal compound may become insufficient.

The cholesteric liquid crystal composition of the invention may further contain the following components.

In the invention, it is particular preferable to contain a surfactant. If a surfactant is included, in a case where a layer is formed by applying a liquid crystal composition in a state of a coating liquid, the surfactant serves to three-dimensionally control an alignment state at the surface of the layer interfacing with air, and especially in a case of a cholesteric liquid crystal phase, higher purity of color light having a selectively reflected wavelength can be obtained.

In the cholesteric liquid crystal composition of the invention, the surfactant used is sometimes referred to as an air interface alignment agent. An air interface alignment agent is a surfactant exerting an excluded volume effect. As used herein, having an excluded volume effect means control of aligning liquid crystal (molecules) at the air interface side, that is, three-dimensional control of a spatial alignment state of a liquid crystal at a layer surface interfacing with air when a layer including a liquid crystal composition is formed by application of coating. In more detail, this term means control of pre-tilt angles of liquid crystal molecules at the air interface side.

The requirements for a preferable molecular structure of an air interface alignment agent are to have a flexible hydrophobic moiety and a moiety having at least one ring unit and a structural stiffness (hereinafter referred to as a stiff moiety). The flexible hydrophobic moiety can be either a perfluoro chain or a long alkyl chain depending on the kind of a liquid crystal compound used. Since a hydrophobic moiety is flexible, the hydrophobic moiety can effectively be located on the air side.

An air interface alignment agent may be of a short molecular chain having a molecular weight of the order of several hundreds or of the polymer or the oligomer consisting of the short molecular chain. Furthermore, there may be included a polymerizable functional group in the molecule of the agent depending on the use purposes.

In a case where such an air interface alignment agent is used, a flexible hydrophobic moiety of an air interface alignment agent is arranged to the air interface; and at the same time, a stiff moiety is arranged to a liquid crystal molecule orientation, shaped to be flat and positioned in parallel to the air interface, to thereby permit alignment of liquid crystal molecules parallel to the air interface.

On the other hand, if a stiff moiety is oriented in a direction perpendicular to the air interface, liquid crystal molecules can be aligned in a direction perpendicular to the air interface.

Specifically, a nonionic surfactant is preferably used and the following compounds may be exemplified.

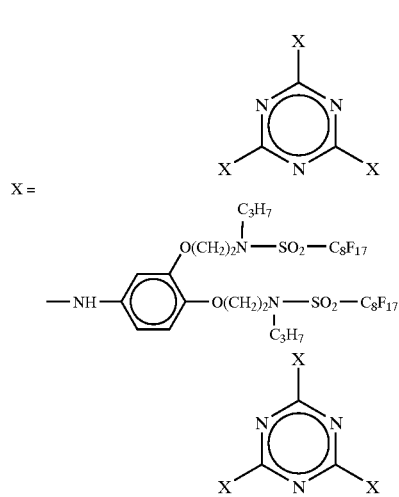

-continued

X =
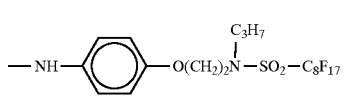

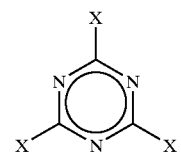

X =
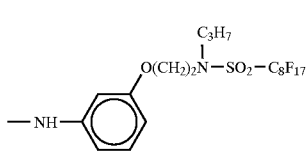

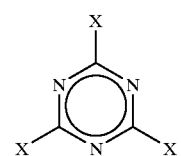

X =
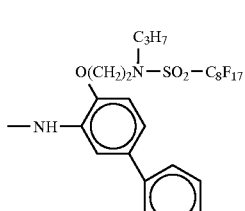

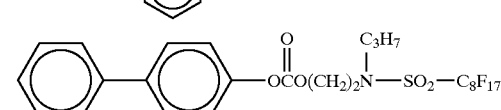

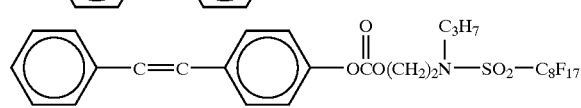

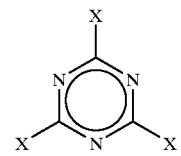

X =
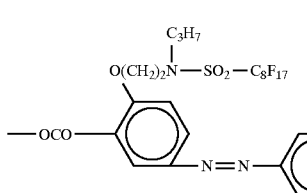

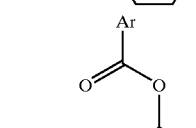

Ar =
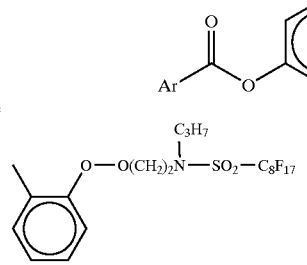

-continued

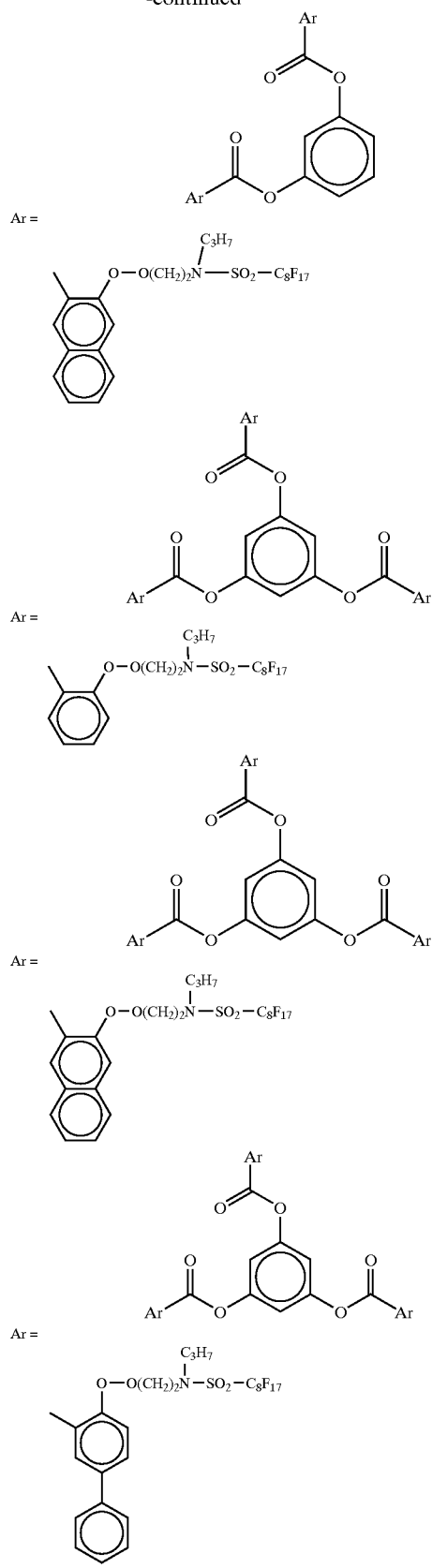

The addition amount of an air interface alignment agent is preferably a quantity to cover a surface of the air interface side of a layer including a liquid crystal composition by one molecule, arid preferably of from 0.05 to 5 mass % and more preferably of from 0.1 to 1.0 mass % relative to a total solid content (mass) of the liquid crystal composition. When the addition amount is less than 0.05 mass %, the effects of the agent are not always exerted, while when the addition amount is in excess of 5 mass %, an air interface alignment agent itself occasionally causes an association, resulting in phase separation from liquid crystal.

If an air interface alignment agent is used, a surface tension can be decreased. Other kinds of surfactants than the air interface alignment agent can be used together with this agent for the purpose of further reducing a surface tension and improving coatability.

For example, in a case where a layer is formed by applying a liquid crystal composition in a state of a coating liquid, the surfactant serves to three-dimensionally control an alignment state at the surface of the layer interfacing with air, and especially in a case of a cholesteric liquid crystal phase, higher purity of color light having a selectively reflected wavelength can be obtained.

The polymerization inhibitor may be added to improve storability. Examples of the polymerization inhibitor include hydroquinone, hydroquinone monomethyl ether, phenot.hiazine, benzoquinone, and the derivatives thereof. The addition amount of the polymerization inhibitor is preferably from 0 to 10% by mass, more preferably from 0 to 5% by mass, relative to the amount of polymerizable monomer used.

The cholesteric liquid crystal phase (liquid crystal composition) can be prepared by dissolving or dispersing the aforementioned respective components in the solvent described above and then formed into an arbitrary shape, or disposed onto a support or the like for use. Examples of the solvent include 2-butanone, cyclohexanone, methylene chloride and chloroform.

DESCRIPTION OF THE PREFERRED EMBODIMENTS

Hereinafter, the preferred embodiments of the cholesteric liquid crystal color filter of the present invention are described by reference to the drawings.

<<Cholesteric Liquid Crystal Color Filter Including Partition Walls>>

Figure 1A:
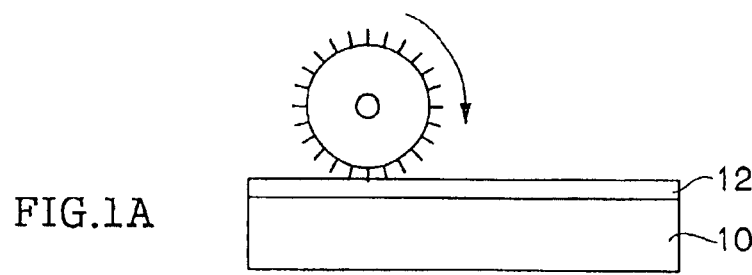
FIGS. 1A to 1E are schematic drawings showing the steps for producing a cholesteric liquid crystal color filter of the present invention characterized in that partition walls are formed therein.
Figure 1B:
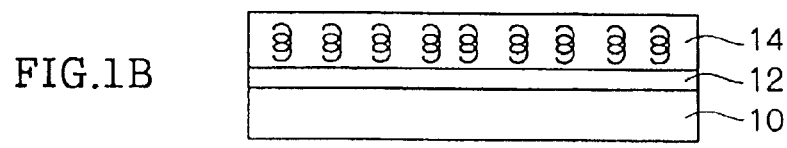

A process for producing a cholesteric liquid crystal color filter according to a first aspect of the invention comprises the steps of forming an LCD substrate 10 having formed thereon an alignment layer 12, as shown in FIG. 1A, and of forming a liquid crystal layer 14 on the alignment layer 12 as shown in FIG. 1B.

The production process may be implemented in accordance with the following embodiment (1) or (2):

(1) an embodiment in which partition walls are formed at areas corresponding to the boundary of each pixel in the liquid crystal layer while the layer is in an isotropic liquid state or in a cholesteric state not exhibiting selective reflection of light in the visible region, and thereafter each pixel is formed, and (2) an embodiment in which each pixel is formed in the liquid crystal layer, and thereafter partition walls are formed.

By reference to the drawings, FIG. 1A to 1E show the embodiment (1) mentioned above.

Hereinafter, common processing steps for embodiments (1) and (2) are described, and each of embodiments (1) and (2) is described thereafter.

<Formation of a Liquid Crystal Layer>

In order to form a liquid crystal layer on a substrate, there are exemplified (I) a mode in which a transfer material having a tentative support having disposed thereon a liquid crystal composition in a coating solution is prepared and the transfer material is transferred onto a substrate; and (II) a mode in which a cholesteric liquid crystal composition is directly coated onto a substrate.

—Step of Providing a Tentative Support with a Liquid Crystal Composition in the Form of a Coating Solution to Prepare a Transfer Material Having at Least the Liquid Crystal Layer Thereon—

The liquid crystal composition in the form of a coating solution can be prepared by dissolving and dispersing the respective components in a suitable solvent. Examples of the solvent include 2-butanone, cyclohexanone, methylene chloride and chloroform.

A cushioning layer containing a thermoplastic resin or the like may be arranged between a liquid crystal layer and a tentative support to securely achieve adhesion during transfer even when a transfer material which is contaminated with e.g. foreign matters thereon is used, and the surface of the cushioning layer is preferably subjected to aligning treatment such as rubbing (aligning step).

Then, the transfer material is laminated on a substrate. Not only the substrate described above but also an image-receiving material having an image-receiving layer on a substrate may be used. The substrate may be coated directly with the liquid crystal composition, but transferring method is preferable in view of the cost and loss of the material. Then, the tentative support is peeled off from the substrate to thereby provide a substrate having disposed thereon the cholesteric liquid crystal layer. The liquid crystal layer can further be laminated with another layer to form plural layers.

—Step of Directly Coating a Liquid Crystal Composition onto a Substrate to Produce a Color Filter—

In this step, a liquid crystal layer may be formed by applying a coating solution prepared in the same manner as above by conventionally known coating methods using a bar coater or a spin coater (coating step).

The same alignment layer as described above may be formed between a cholesteric liquid crystal layer and a tentative support. The surface of the alignment layer is preferably subjected to aligning treatment such as rubbing (aligning step).

—Step of Forming Partition Walls—

In the step of forming partition walls, the liquid crystal layer is made to show an isotropic liquid state or a cholesteric state not exhibiting selective reflection of light in the visible region, and thereafter irradiated with UV light of wavelengths to which the polymerization initiator is photosensitive through a photomask to form partition walls at areas corresponding to the boundary of each pixel in the liquid crystal layer.

The liquid crystal layer can be made to show an isotropic liquid state by heating it to a temperature at which the liquid crystal layer exhibits an isotropic liquid state.

The liquid crystal layer can be made to show a cholesteric state exhibiting selective reflection of light in the ultraviolet or the infrared region, in the following manners (I) and (II).

Manner (I): In order to achieve selective reflection of light in the ultraviolet region, the kinds or the amounts of the photoreactive chiral agent to be added to the cholesteric liquid crystal composition are specified such that a high twisting force can be induced.

Manner (II): In order to achieve selective reflection of light in the infrared region, light having an absorption wavelength of the photoreactive chiral agent to induce such selective reflection is irradiated in a suitable quantity before forming partition walls.

Figure 1C:
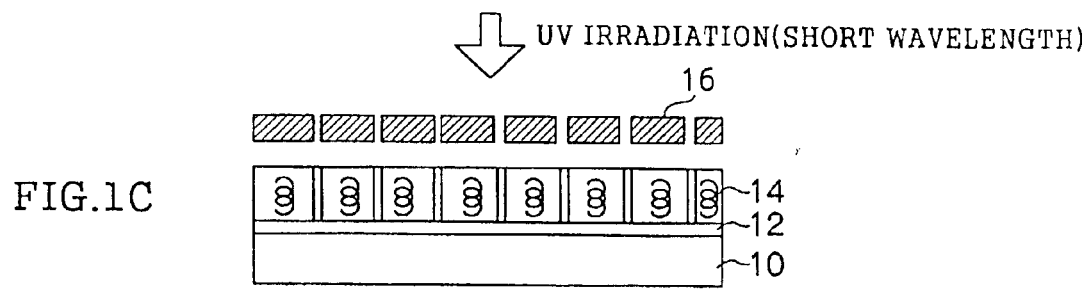
Figure 1D:
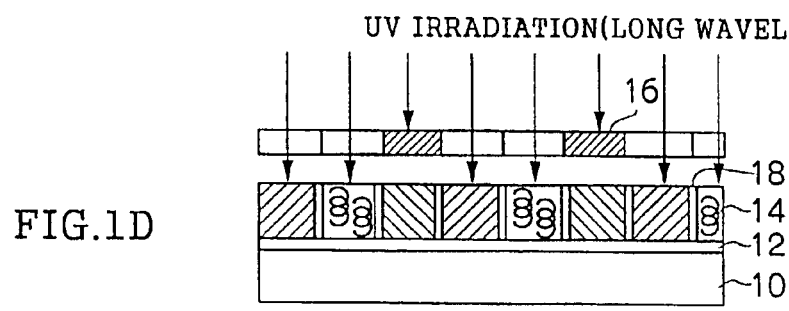
Figure 1E:
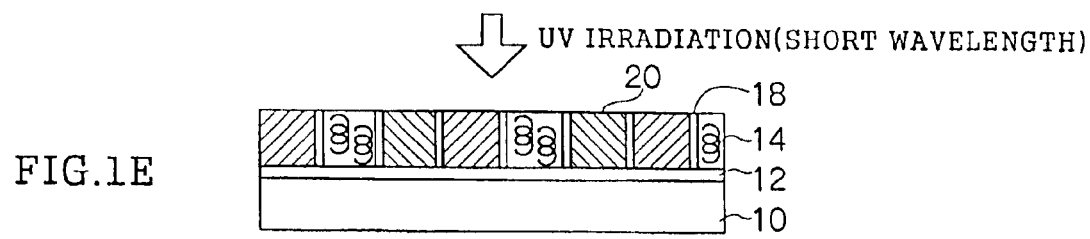

In order to polymerize and cure the partition walls, the liquid crystal composition is irradiated with UV light having wavelengths to which the polymerization initiator is photosensitive through a photomask 16 having openings only at the areas corresponding to partition walls, as shown in FIG. 1C. In the relationship between a spectral sensitivity of a photoreactive chiral agent and a spectral sensitivity of a polymerization initiator, the polymerization initiator is usually spectrally sensitive to the wavelengths that are shorter than wavelengths to which the photoreactive chiral agent is spectrally sensitive. Accordingly, if irradiated through a photomask with UV light having wavelengths corresponding to the spectral sensitivity of the polymerization initiator, only the areas corresponding to partition walls are polymerized and cured, to form partition walls 18 as shown in FIG. 1D.

The illuminance (illumination intensity) of light for causing polymerization and curing in the step of forming partition walls is not particularly limited, and can suitably be selected depending on the material used such that the wavelengths to which the polymerization initiator is photosensitive can be obtained. The light source used for irradiation is preferably a high-energy light source to emit UV light, such as a high-pressure mercury lamp, a metal halide lamp and an Hg—Xe lamp to rapidly cause a structural change and polymerization reaction of the liquid crystal compound. The light source preferably has a function of varying light quantities.

—Step of Forming Pixels—

While the cholesteric liquid crystal layer is heated to about 100° C., the layer is irradiated with UV light having illuminance $v^1$ through a photomask, so as to form a pixel pattern (color pixel 20) which exhibits selective reflection of color.

In the step of light irradiation, both patterning and fixing (polymerizing and curing) of the liquid crystal compound can be conducted by light irradiation. That is, through the step of patterning in which imagewise exposure to a first light of wavelengths to which the photoreactive chiral agent is highly photosensitive is conducted [FIG. 1D], and the step of curing in which a second light of wavelengths to which the polymerization initiator is highly photosensitive is irradiated to fix the helical structure of the liquid crystal compound to exhibit desired selective reflection of color [FIG. 1E], a cholesteric liquid crystal color filter is obtained.

When the liquid crystal composition is irradiated with the first light, the coexisting photoreactive chiral agent reacts, depending on illuminance thereof, to cause a change in the helical structure of the liquid crystal compound, whereby different selective reflection of colors are reflected in an imagewise pattern. Accordingly, by conducting light irradiation with varied illumination intensities for each region, a plurality of colors are exhibited depending on illumination intensities applied corresponding to respective colored regions. For example, an image having different colored regions can be formed by irradiating the liquid crystal composition once with light through a photomask having different light transmittances to perform imagewise exposure [FIG. 1D]. By curing (fixing) it with another irradiation with a second light, the liquid crystal color filter can be prepared.

The wavelength of the first light is preferably set at a wavelength close to the range of wavelengths to which the photoreactive chiral agent is photosensitive, particularly at a wavelength close to the peak photosensitive wavelength of the agent in order to achieve sufficient patterning sensitivity. The wavelength of the second light is preferably set at a wavelength close to the range of wavelengths to which the polymerization initiator is photosensitive, particularly at a wavelength close to the peak photosensitive wavelength of the initiator in order to achieve sufficient photopolymerizing sensitivity.

The illuminance (illumination intensity) of the first and second light is not particularly limited, and can suitably be selected depending on the material used in order to achieve sufficient photosensitivity during patterning as well as during polymerization and curing. The light source used for irradiating the first and second light is preferably a high-energy light source to emit UV light, such as a high-pressure mercury lamp, a metal halide lamp and an Hg—Xe lamp to rapidly cause a structural change and polymerization reaction of the liquid crystal compound. The light source preferably has a function of varying light quantities.

After the fixing step, unnecessary portions of the liquid crystal layer are removed by alkali development.

In the case where colored pixel formation (patterning) is conducted after having formed partition walls, the photoreactive chiral agent is caused to photoisomerize during patterning by light irradiation, and hence the photoisomerized chiral agent is confined within respective colored pixels to prevent diffusion thereof in the aligning step, whereby decrease in color pixel resolution attributable to diffusion of the photoisomerized chiral agent can be prevented.

In the case where the partition walls arc formed after having formed colored pixels (patterning), the photoreactive chiral agent is caused to photoisomerize during patterning by light irradiation, however, diffusion of the photoisomerized chiral agent can be prevented by the partition walls to be formed later, and as a result, decrease in color pixel resolution resulting from diffusion of the photoisomerized chiral agent can be prevented.

<<Cholesteric Liquid Crystal Color Filter Including Openings>>

Hereinafter, a second aspect of the invention, that is, the process for producing a cholesteric liquid crystal color filter having formed contact holes is described, by reference to a mode in which a photoreactive cholesteric liquid crystal composition is used. Depending on the production mode selected, the process may appropriately comprise the steps of: conducting aligning treatment on the surface of a substrate in contact with the cholesteric liquid crystal composition (aligning step); transferring a liquid crystal layer by laminating and peeling a transfer material (transferring step); and forming a liquid crystal layer by applying the cholesteric liquid crystal composition (coating step).

For example, the production process may be implemented in accordance with the following mode "a" or "b". In either of the two modes, the color filter can suitably be prepared.

—Mode "a"—

(Step 1) Step of Providing a Tentative Support with a Liquid Crystal Composition in the Form of a Coating Solution to Prepare a Transfer Material Having at Least the Cholesteric Liquid Crystal Layer Thereon:

The cholesteric liquid crystal composition in the form of a coating solution can be prepared by dissolving and dispersing the respective components in a suitable solvent. Examples of the solvent include 2-butanone, cyclohexanone, methylene chloride and chloroform.

A cushioning layer containing a thermoplastic resin or the like may be arranged between a liquid crystal layer and a tentative support to securely achieve adhesion during transfer, even when a transfer material which is contaminated with e.g. foreign matters thereon is used, and the surface of the cushioning layer is preferably subjected to aligning treatment such as rubbing (aligning step).

(Step 2) Step of Laminating the Transfer Material on a Light Transmissive Substrate:

As the substrate, not only a light transmissive substrate but also an image-receiving material having an image-receiving layer on a substrate can be used. The liquid crystal layer may be formed by applying coating as shown in Mode "b" to be described later, but transferring method is preferable in view of the cost and loss of the material.

(Step 3) Step of Forming Pixels by Image-wise Forming Colored Pixels:

The support of a transfer material is peeled off to leave a cholesteric liquid crystal layer on a substrate, and the resultant liquid crystal layer is subjected to patterning by irradiation with light of the wavelength $\lambda^a$ through a photomask having a plurality of regions each having different light transmittances, to thereby form colored pixels. The liquid crystal layer can further laminated with additional layers to have a plurality of layers after the steps 4 and 5 have been performed.

(Step 4) Step of Fixing to Cause Polymerization by Irradiating Light of a Wavelength $\lambda^b$:

The liquid crystal layer is exposed to light using a photomask to shade the positions where contact holes and openings for electrode lead-out portions are to be formed within a pixel, so that the regions other than the light-shaded portions are polymerized and cured.

(Step 5) Step of Developing Irradiated Areas Using a Solvent:

The light-shaded portions are removed by dissolution thereof with a solvent, to thus form contact holes and openings for electrode lead-out portions.

The transfer material and the material for the substrate used in Steps 1 to 3 above are described in detail in JP-A Nos. 11-342896 and 1-343665 filed previously by the present inventors.

—Mode "b"—

(Step 1) Step of Directly Coating a Cholesteric Liquid Crystal Composition onto a Substrate (Support) to Form a Cholesteric Liquid Crystal Layer for Producing a Color Filter:

The liquid crystal layer can be formed by applying the cholesteric liquid crystal composition prepared in the form of a coating solution in the same manner as above by conventionally known coating methods using a bar coater or a spin coater. The same alignment layer as described above may be formed between a cholesteric liquid crystal layer and a substrate. The surface of the alignment layer is preferably subjected to aligning treatment such as rubbing (aligning step).

(Step 2) The Same Step as Performed in Steps 3 to 5 in Mode "a".

Hereinafter, the procedures are described in more detail by reference to FIGS. 2A to 2J.

FIGS. 2A to 2E illustrate the steps of forming a cholesteric liquid crystal layer; FIGS. 2F to 2H schematically illustrate the steps of forming a selectively reflective film (color filter layer) composed of RGB pixels; and FIGS. 2I(a) to 2J illustrate the steps of forming a selectively reflective film (color filter layer) having formed contact holes therein.

First, at least a liquid crystal compound, a chiral agent and a polymerization initiator are dissolved in a suitable solvent to prepare a cholesteric liquid crystal composition in the form of a coating solution.

Figure 2A:
FIGS. 2A to 2E are schematic drawings showing the steps of forming a cholesteric liquid crystal layer in the process for producing the cholesteric liquid crystal color filter according to the invention.

As shown in FIG. 2A, a tentative support 10 is prepared, and on the surface thereof is provided a cushioning layer (a thermoplastic resin layer) 12 by coating e.g. an acrylic resin, polyester or polyurethane. Further, an alignment layer may be laminated on the resultant layer. The thus provided alignment layer may be subjected to rubbing, as necessary, for the purpose of improving alignment (aligning step).

Figure 2B:
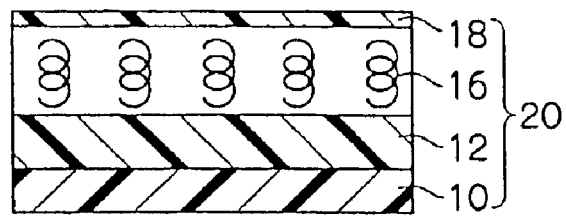

Then, as shown in FIG. 2B, on the cushioning layer 12 is applied a cholesteric liquid crystal composition in the form of a coating solution, followed by drying to finally form a cholesteric liquid crystal layer 16 in a smectic phase state, a microcrystalline state or a glass state (non-liquid-crystal state), after which a cover film 18 is provided on the cholesteric liquid crystal layer 16, to thus prepare a transfer material. Hereinafter, the transfer material is referred to as a transfer sheet 20.

Figure 2C:
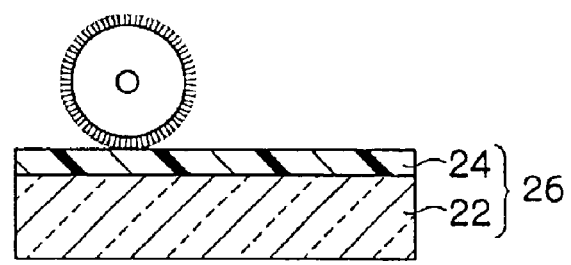

As shown in FIG. 2C, another substrate 22 is prepared, and an alignment layer 24 made of polyvinyl alcohol is formed on the substrate 22, followed by rubbing on the surface thereof (aligning step). Hereinafter, this substrate is referred to as a color filter substrate 26.

Figure 2D:
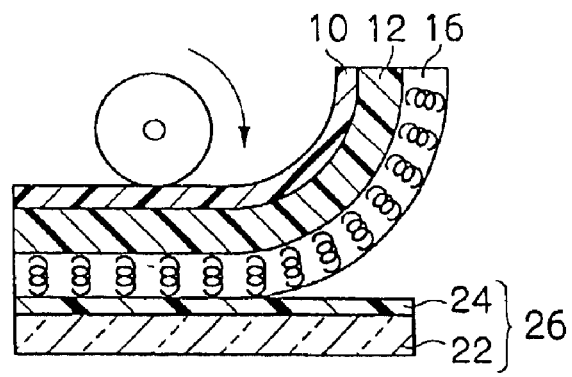
Figure 2E:
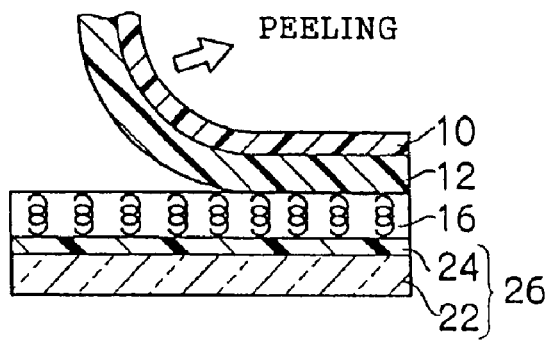
Figure 2F:
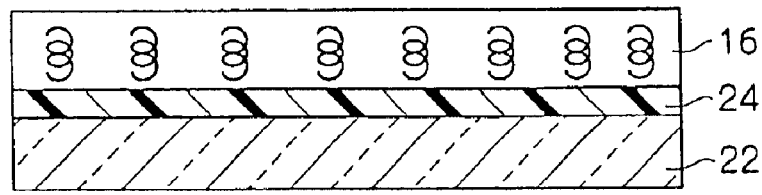
FIGS. 2F to 2H are schematic drawings shows the steps of forming a selectively reflective film (color filter layer) composed of RGB pixels in the process for producing the cholesteric liquid crystal color filter according to the invention.
Figure 2G:
Figure 2G:
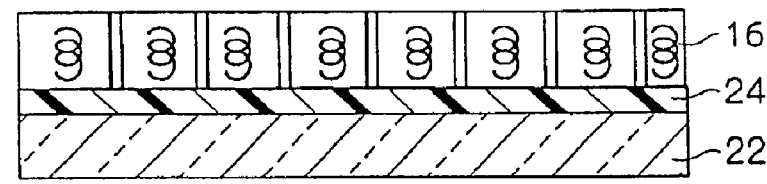
Figure 2H:
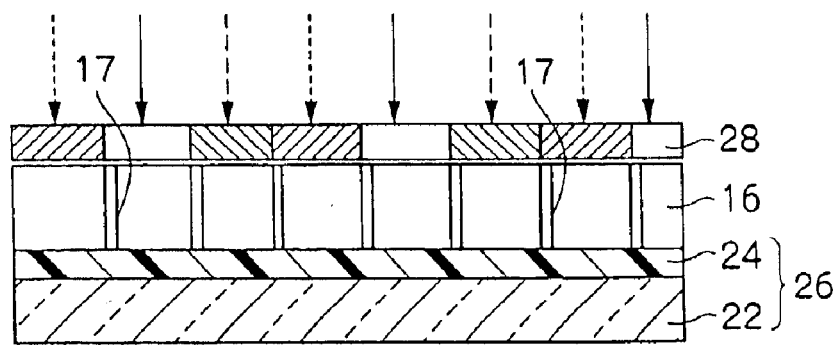

After the cover film 18 is peeled off from the transfer sheet 20, the surface of the cholesteric liquid crystal layer 16 of the transfer sheet 20 is brought into contact with the surface of the alignment layer 24 of the color filter substrate 26 as shown in FIG. 2D and lamination is conducted through a roll rotating in the direction of the arrow in the drawing. Thereafter, as shown in FIG. 2E, if the cushioning layer 12 is peeled off from the cholesteric liquid crystal layer 16 of the transfer sheet 20, the cholesteric liquid crystal layer 16 is transferred to the color filter substrate 26 (transferring step; FIG. 2F). In this case, it is not always necessary to peel off the cushioning layer 12 together with the tentative support 10.

Then, as shown in FIG. 2G, the cholesteric liquid crystal layer is irradiated with UV light having wavelengths to which the polymerization initiator is photosensitive by arranging a photomask 30 which has openings corresponding to the partition walls to be formed. In the relationship between a spectral sensitivity of a photoreactive chiral agent and a spectral sensitivity of a polymerization initiator, the polymerization initiator is usually spectrally sensitive to the wavelengths that are shorter than wavelengths to which the photoreactive chiral agent is spectrally sensitive. Accordingly, if irradiated with UV light through a photomask, the liquid crystal layer 16 is polymerized and cured only at the areas corresponding to partition walls to thus form partition walls 17, as shown in FIG. 2H.

The illuminance (illumination intensity) of light for forming partition walls is not particularly limited, and can suitably be selected depending on the material used such that the wavelengths to which the polymerization initiator is photosensitive can be obtained. The light source used is preferably a high-energy light source to emit UV light, such as a high-pressure mercury lamp, a metal halide lamp and an Hg—Xe lamp to rapidly cause a structural change and polymerization reaction of the liquid crystal compound. The light source preferably has a function of varying light quantities.

As described above, formation of partition walls may be conducted either before or after formation of pixels.

After transferring is performed, the cholesteric liquid crystal layer 16 is maintained in a non-liquid-crystal state, and a photomask 28 having a plurality of regions different in light transmittance are arranged on the cholesteric liquid crystal layer 16. Then, as shown in FIG. 2H, the cholesteric liquid crystal layer 16 is irradiated with the first light (wavelength: $\lambda^a$) through the photomask 28. During or after the irradiation, the liquid crystal layer is heated to a temperature at which the liquid crystal can reflect selective wavelengths caused by isomerization of the photoreactive chiral agent depending on the amount of irradiated light (pixel-forming step).

In the cholesteric liquid crystal layer 16, there are formed pixels each having a different helical pitch depending on the amount of irradiated light, namely, a region in which green light (G) is reflected while blue light (B) and red light (R) are transmitted, a region in which blue light (B) is reflected while green light (G) and red light (R) are transmitted, and a region in which red light (R) is reflected while green light (G) and blue light (B) are transmitted.

Figure 2I:
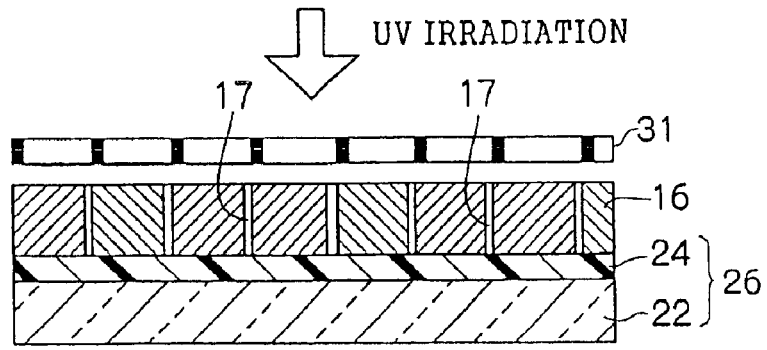
FIGS. 2I(a) to 2J are schematic drawings showing the steps of forming a selectively reflective film (color filter layer) having contact holes (openings) in the process for producing the cholesteric liquid crystal color filter according to the invention.
Figure 2I:
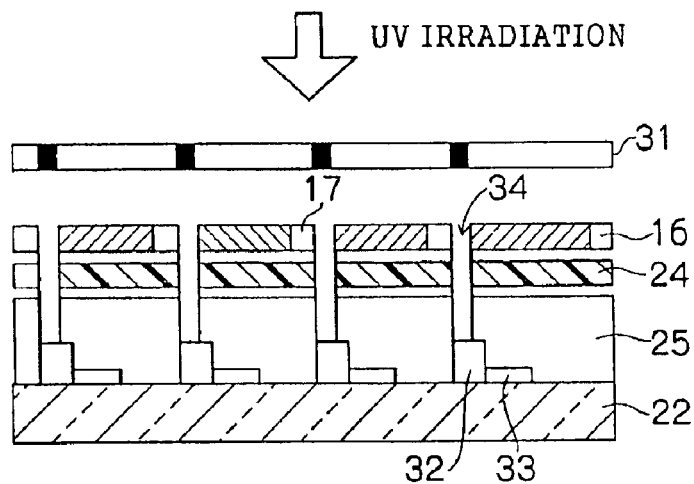

As shown in FIG. 2I(a), the cholesteric liquid crystal layer 16 is then irradiated with UV light of a wavelength (wavelength: $\lambda^2$), which is different from the wavelength of light irradiated in step 2H, through a photomask 31 having light-shading areas corresponding to contact holes and electrode lead-out portions, such that respective colored pixel regions exhibiting selective reflection of different colors are fixed. Thereafter, the liquid crystal layer is subjected to developing treatment with a solvent such as methyl ethyl ketone, 2-butanone or chloroform to remove undesired portions (e.g., remained cushioning layer or intermediate layer) on the cholesteric liquid crystal layer 16, while the light-shaded, non-irradiated regions of the liquid crystal layer are simultaneously removed by dissolution thereof with the solvent, whereby contact holes and openings for electrode lead-out portions are formed.

FIG. 2I(b) is an enlarged view showing a part of the layer construction illustrated in FIG. 2I(a). As shown in FIG. 2I(b), the portions irradiated with UV light (wavelength: $\lambda^2$) are fixed and left, while the light-shaded, non-irradiated portions of the liquid crystal layer 16 are removed to thereby form openings 34 such as contact holes. In FIG. 2I(b), there has been formed beforehand an identical opening to pass through the alignment layer 24 and the light-absorbing layer 25. In FIG. 2I(b), TFT elements 32 and metal wirings 33 are shown.

Figure 2J:
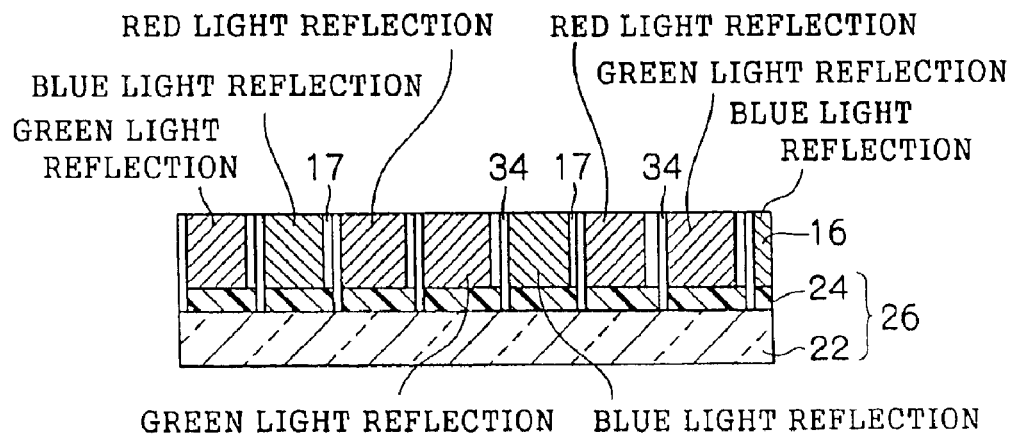

As described above, a cholesteric liquid crystal layer (selective reflective film) composed of BGR reflective regions, partition walls, and contact holes and openings for electrode lead-out portions can be formed as shown in FIG. 2J.

The steps shown in FIGS. 2A to 2J illustrate one embodiment of a process for producing a color filter in a laminating mode, but a coating mode may be employed in which a liquid crystal layer is directly applied to form the liquid crystal layer on the color filter substrate. If the coating manner is employed, the cholesteric liquid crystal composition is applied and dried on the alignment layer 24 of the color filter substrate 26 as shown in FIG. 2C such that the cholesteric liquid crystal layer (FIG. 2F) in a non-liquid-crystal state can be formed, followed by successively conducting the above steps as shown in FIGS. 2G to 2J.

The foregoing steps, the transfer material and the material for the substrate used are described in detail in JP-A Nos. 11-342896 and 11-343665 filed previously by the present inventors.

As described above, according to the present invention, there is provided a high-quality color filter excellent in transmittance and color purity of colored pixels at low costs since reduced loss of materials and simplified steps are achieved by eliminating the steps of forming a resist and subsequently dry-etching the resist, while contact holes and openings for electrode lead-out portions can be formed at low costs and the aligning treatment of the cholesteric liquid crystal composition can be conducted easily and efficiently.

EXAMPLES

Hereinafter, the present invention is described by reference to the Examples, which are not intended in any way to limit the invention.

<Cholesteric Liquid Crystal Color Filter Including Partition Walls>

Example 1

(Preparation of a Photosensitive Transfer Material)

A polyethylene terephthalate base film of 75 μm in thickness serving as a tentative support was coated, using a spin coater, with a coating solution having the following formulation to form a thermoplastic resin layer and dried in an oven at 100° C. for 2 minutes to thus provide on the support the thermoplastic resin layer of 15 μm in thickness. (Formulation of a Coating Solution for a Thermoplastic Resin Layer)

| | |
|---|---|
| Styrene/acrylic acid copolymer (copolymerization ratio 60/40; weight average molecular weight 8,000) | 15 parts by mass |

-continued

| | |
|---|---|
| 2,2-Bis(4-(methacryloxypolyethoxy) phenyl propane) | 7 parts by mass |
| Fluorine-containing surfactant (F-176PF, Dainippon Ink and Chemicals, Inc.) | 1.5 parts by mass |
| Propylene glycol monomethyl ether | 28 parts by mass |
| Methyl ethyl ketone | 27 parts by mass |

Then, the thermoplastic resin layer was coated using a spin coater with a coating solution having the following formulation to form an intermediate layer and dried in an oven at 100° C. for 2 minutes to provide on the resin layer an intermediate layer of 1.6 μm in thickness. Further, the surface of the intermediate layer was subjected to rubbing with a nylon cloth.

(Formulation of a Coating Solution for an Intermediate Layer)

| | |
|---|---|
| Polyvinyl alcohol (PVA205 manufactured Kuraray Co., Ltd.) | 15 parts by mass |
| Polyvinyl pyrrolidone (PVP-K30 manufactured by Gokyosangyo Co., Ltd.) | 6 parts by mass |
| Methanol | 173 parts by mass |
| Ion-exchanged water | 211 parts by mass |

Then, a coating solution prepared by dissolving 17.2 parts by mass of the compound a shown below (polymerizable liquid crystal compound), 2.2 parts by mass of the compound b (chiral agent), 0.6 part by mass of the compound c (polymerization initiator) and 0.04 part by mass of the compound d (surfactant) in 80 parts by mass of cyclohexanone as the solvent was applied onto the intermediate layer using a spin coater and dried in an oven at 100° C. for 2 minutes to form a photosensitive liquid crystal layer. A polypropylene film of 12 μm in thickness was laminated as a cover film onto the photosensitive liquid crystal layer at room temperature so that a photosensitive transfer material having the thermoplastic resin layer, the intermediate layer and the photosensitive liquid crystal layer laminated in this order on the base film was obtained.

Compound a

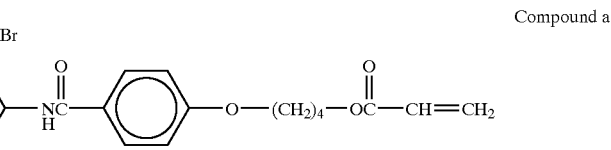

Compound b

R =

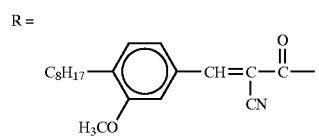

AS-842 manufactured by The Green Cross Corporation

Compound c

-continued

Compound d

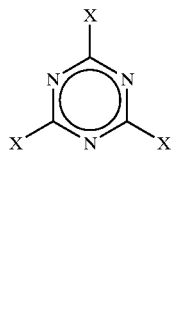

X = 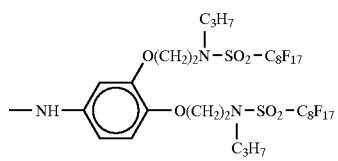

(Production of a Color Filter)

The process for producing a color filter is described hereinafter.

(1) Preparation of a Filter Substrate

A glass substrate was coated using a spin coater with a coating solution for a polyimide alignment layer, dried in an oven at 100° C. for 5 minutes and then baked in an oven at 250° C. for 1 hour to dispose an alignment layer thereon. Then, the surface thereof was subjected to aligning treatment by rubbing, to prepare a glass substrate provided with an alignment layer.

(2) Formation of a Filter Layer

The cover film was removed from the photosensitive transfer sheet, and the photosensitive liquid crystal layer of the photosensitive transfer sheet was brought into contact with the alignment layer of the glass substrate provided with the alignment layer followed by lamination under the conditions of a pressure of 2 kg/m$^2$, a roller temperature of 130° C. and a feed rate of 0.2 m/min using a laminator (First Laminator 8B-550-80 manufactured by Taisei Laminator Co., Ltd.). Thereafter, the tentative support of polyethylene terephthalate was peeled at the interface with the thermoplastic resin layer and then removed.

(3) Formation of Partition Walls

This glass substrate was heated to a temperature (150° C.) at which the liquid crystal layer exhibited an isotropic liquid state. Subsequently, the areas corresponding to pixel boundaries were irradiated with UV light to provide a width of 10 μm. This UV irradiation was conducted using an ultra-high pressure mercury lamp. The irradiation energy was 100 mJ/cm$^2$. In order to avoid exposure with stray light at the pixel portions in the photosensitive liquid crystal layer during UV irradiation, it is preferable to irradiate light of wavelengths far from the peak photosentive wavelength of the photoreactive chiral agent but close to the peak photosensitive wavelength of the polymerization initiator. For this purpose, the photosensitive liquid crystal layer in this example is preferably exposed to light via an interference filter having a central transmissive wavelength at 310 nm.

(4) Formation of a Color Filter Latent Image

Then, this glass substrate was exposed to light, at room temperature, using an ultra-high pressure mercury lamp through a photomask having light transmittance varied at 3 steps (0%, 20%, 92%) each for red pixels, green pixels and blue pixels via an interference filter having a central transmissive wavelength at 365 nm. The irradiation energy was 300 mJ/cm$^2$ for blue pixels.

(5) Color Development

After removing the photomask, the photosensitive resin layer was caused to develop color by maintaining it on a hot plate at a temperature of 120° C. for 3 minutes.

(6) Fixation

The resultant product was maintained on a hot plate at a temperature of 100° C. for 1 minute, and then polymerized and cured by UV irradiation of an entire surface thereof (irradiation energy 300 mJ/cm$^2$) using the same ultra-high pressure mercury lamp via an interference filter having a central transmissive wavelength at 310 nm. Subsequently, a predetermined treating solution (T-PD2 produced by Fuji Photo Film Co., Ltd.) was used to remove the thermoplastic resin layer and the intermediate layer.

In order to facilitate curing of the filter portion, baking was conducted in an oven at 200° C. for 10 minutes, to provide a color filter substrate having provided thereon red color pixel, green color pixel and blue color pixel patterns.

When the thus prepared color filter was observed under an optical microscope, it was confirmed that no coloring occurred at wall portions, and that no interpixel color mixing occurred.

Example 2

A color filter was obtained in the same manner as in Example 1 except that instead of heating to a temperature at which the liquid crystal layer exhibited an isotropic liquid state for forming partition walls in Example 1, a glass substrate was heated to a temperature (90° C.) at which the liquid crystal layer showed a cholesteric state, while simultaneously irradiating light having an absorption wavelength (365 nm) of the photoreactive chiral agent at a specified irradiation energy (500 mJ/cm$^2$) to display selective reflection of light in the infrared region, followed by irradiation with light having an absorption wavelength of the polymerization initiator.

When this color filter was observed under an optical microscope, it was confirmed that no coloring occurred at wall portions, and that no interpixel color mixing occurred.

Example 3

A color filter was obtained in the same manner as in Example 1 except that the addition amount of the photoreactive chiral agent was changed to 4 parts by mass to prepare a coating solution of a liquid crystal composition for forming a substrate, so as not to display selective reflection of visible light before photoisomerization occurred, and the substrate was heated to a temperature (90° C.) at which the liquid crystal layer showed a cholesteric state followed by exposure to UV light having an absorption wavelength of the polymerization initiator such that partition walls were polymerized and cured.

When the thus obtained color filter was observed under an optical microscope, it was confirmed that no coloring occurred at wall portions, and that no interpixel color mixing occurred.

Comparative Example 1

A comparative color filter was obtained in the same manner as in Example 1 except that the liquid crystal layer was not heated but was made to have a solid state.

When the color filter was observed under an optical microscope, walls were insufficiently formed.

Comparative Example 2

A comparative color filter was obtained in the same manner as in Example 2 except that the substrate was exposed to light having an absorption wavelength (365 nm) of the photoreactive chiral agent at a specified irradiation energy (300 mJ/cm$^2$) to allow selective reflection of light in the visible region.

When this color filter was observed under an optical microscope, it was confirmed that coloring occurred at wall portions.

Comparative Example 3

A comparative color filter was obtained in the same manner as in Example 3 except that the same liquid crystal composition as employed in Example 1 was used (the addition amount of the chiral agent to the liquid crystal composition was not changed).

When this color filter was observed under an optical microscope, it was confirmed that coloring occurred at wall portions.

<Cholesteric Liquid Crystal Color Filter Including Openings>

Example 4

(1) Preparation of a Color Filter Substrate

A glass substrate was coated using a spin coater with a coating solution for a polyimide alignment layer, dried in an oven at 100° C. for 5 minutes and then baked in an oven at 250° C. for 1 hour to dispose an alignment layer on the substrate. Subsequently, the surface thereof was subjected to aligning treatment by rubbing, to prepare a glass substrate provided with an alignment layer for use as the color filter substrate (see FIG. 2C).

(2) Formation of a Photosensitive Resin Layer

A coating solution for a photosensitive resin layer prepared according to the following formulation was directly applied to the alignment layer of the color filter substrate obtained above and dried in an oven at 100° C. for 2 minutes to form a photosensitive resin layer (cholesteric liquid crystal layer) (see FIG. 2F).

(Formulation of a Coating Solution)

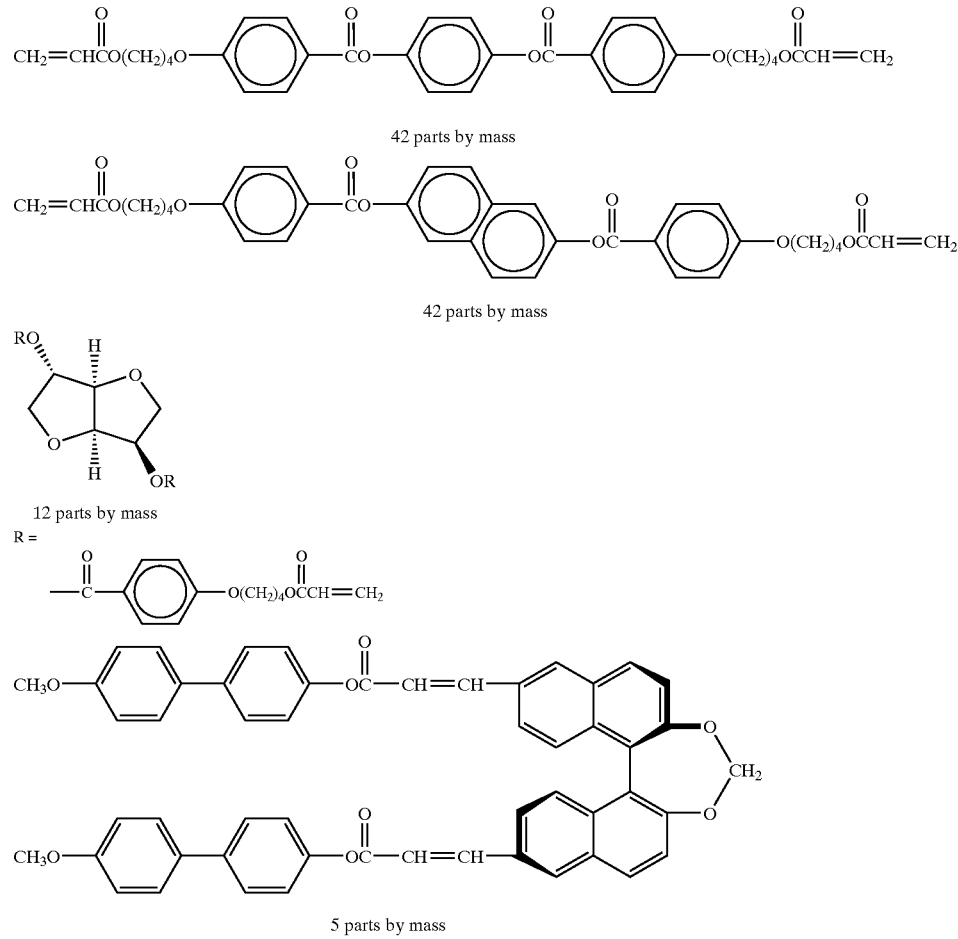

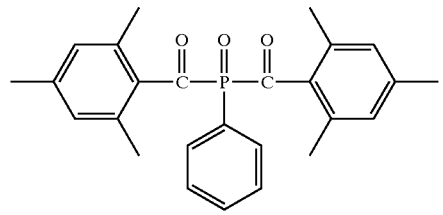

2 parts by mass

Cyclohexanone
400 parts by mass

Dipentaerythritol hexaacrylate
3 parts by mass (3) Formation of Partition Walls

Under a nitrogen atmosphere, while heating the resultant color filter substrate to a temperature at which the photosensitive resin layer (cholesteric liquid crystal layer) exhibited an isotropic liquid crystal state, UV irradiation was conducted using an ultra-high pressure mercury lump (irradiation energy: 500 mJ/cm$^2$) at only portions where partition walls were to be formed. As a result, partition walls were formed, which had a width of 10 μm capable of permitting visible light transmission (see FIGS. 2G to 2H).

In order to avoid exposure with stray light at the pixel portions in the photosensitive liquid crystal layer during UV irradiation, it is preferable to irradiate the layer with light of wavelengths far from the peak photosensitive wavelength of the photoreactive chiral agent but close to the peak photosensitive wavelength of the polymerization initiator.

(4) Pixel-forming Step

Then, the liquid crystal layer of the resultant glass substrate was exposed to light, at room temperature, using an ultra-high pressure mercury lamp (300 mJ/cm$^2$) through a photomask having light transmittance varied at 3 steps (0%, 20%, 92%) each for red (R) pixels, green (G) pixels and blue (B) pixels (see FIG. 2H) via an interference filter having a central transmissive wavelength at 365 nm.

After removing the photomask, the photosensitive resin was caused to develop color by maintaining it on a hot plate at a temperature of 120° C. for 3 minutes.

(5) Fixing Step

Then, while maintaining the filter substrate on a hot plate at a temperature of 100° C. for 1 minute, light exposure (irradiation energy, 500 mJ/cm$^2$) was conducted using the same ultra-high pressure mercury lamp as used above via an interference filter having light-shading areas corresponding to contact holes and openings for electrode lead-out portions, such that the pixel portions were polymerized and cured (see FIG. 2I(a)). If this procedure was conducted in a nitrogen atmosphere, the layer can be polymerized and cured at a low irradiation energy.

(6) Developing Step

Then, developing treatment was conducted using methyl ethyl ketone to remove light-shaded non-irradiated portions and unnecessary portions of the cholesteric liquid crystal layer 16. The photosensitive resin layer at the nor-irradiated portions was dissolved and removed, and consequently openings for., e.g., contact holes could be formed at the desired positions (see FIG. 2I(b)).

To enhance hardening of the regions corresponding to respective pixels, baking was conducted in an oven at 200° C. for 10 minutes, to thereby produce the cholesteric liquid crystal color filter of the present invention having a color filter layer composed of red pixels, green pixels and blue pixels (see FIG. 2J).

As described above, a cholesteric liquid crystal color filter excellent in color purity could be produced easily at low costs with reduced loss of materials, by eliminating additional steps of forming a resist and then dry-etching thereof even if openings for, e.g., contact holes are to be formed.

When this cholesteric liquid crystal color filter was observed under an optical microscope, no interpixel color mixing occurred.

As detailed above, according to the invention, there is provided a cholesteric liquid crystal color filter in which color pixel resolution is improved by securely preventing diffusion of the chiral agent isomerized by UV irradiation and that exhibits excellent contrast when used as the liquid crystal display element.

Further, according to the invention, there is also provided a process for producing a cholesteric liquid crystal color filter that exhibits a broad range of selectively reflected colors and excellent color purity, by which aligning treatment can easily and effectively be conducted, contact holes and openings for electrode lead-out portions per pixel can readily be formed at a low cost, and in which reduced loss of materials is achieved.

What is claimed is:

1. A cholesteric liquid crystal color filter including partition walls that are formed at pixel boundaries, produced by:
    forming a liquid crystal layer comprising a cholesteric liquid crystal composition including at least a liquid crystal compound, a photoreactive chiral agent and a polymerization initiator; and
    irradiating the liquid crystal layer with UV light having wavelengths to which the polymerization initiator is photosensitive through a photomask to form the partition walls at areas corresponding to the pixel boundaries while the liquid crystal layer is in an isotropic liquid state or in a cholesteric state not exhibiting selective reflection of light in the visible range.

2. The cholesteric liquid crystal color filter according to claim 1, wherein the liquid crystal compound is a polymerizable liquid crystal compound and the partition walls are formed by polymerizing and curing the liquid crystal compound.

3. The cholesteric liquid crystal color filter according to claim 1, wherein the liquid crystal composition comprises a surfactant.

4. The cholesteric liquid crystal color filter according to claim 1, wherein the liquid crystal compound is a nematic liquid crystal compound having anisotropy of a refractive index Δn of 0.10 to 0.40.

5. The cholesteric liquid crystal color filter according to claim 1, wherein the liquid crystal compound is contained in an amount of 30 to 98% by mass relative to the total solid content of the liquid crystal composition.

6. The cholesteric liquid crystal color filter according to claim 1, wherein the photoreactive chiral agent is contained in an amount of 2 to 30% by mass relative to the total solid content of the liquid crystal composition.

7. The cholesteric liquid crystal color filter according to claim 1, wherein the polymerization initiator is contained in an amount of 0.1 to 20% by mass relative to the total solid content of the liquid crystal composition.

8. The cholesteric liquid crystal color filter according to claim 1, further containing a polymerizable monomer in an amount of 0.5 to 50% by mass relative to the total solid content of the liquid crystal composition.

9. The cholesteric liquid crystal color filter according to claim 3, wherein the surfactant is a nonionic surfactant.

10. The cholesteric liquid crystal color filter according to claim 1, wherein the polymerization initiator is spectrally sensitive to the wavelengths that are shorter than wavelengths to which the photoreactive chiral agent is spectrally sensitive.

* * * * *